(12) United States Patent
Kim et al.

(10) Patent No.: US 11,479,179 B2
(45) Date of Patent: Oct. 25, 2022

(54) CAMERA MIRROR ASSEMBLY FOR VEHICLE

(71) Applicant: SL Mirrortech Corporation, Siheung-si (KR)

(72) Inventors: Yong-Hwan Kim, Siheung-si (KR); Yeong-Kook Cho, Siheung-si (KR); Yong-Hei Kim, Siheung-si (KR)

(73) Assignee: SL Mirrortech Corporation, Siheung-si (KR)

( * ) Notice: Subject to any disclaimer, the term of this patent is extended or adjusted under 35 U.S.C. 154(b) by 0 days.

(21) Appl. No.: 17/387,332

(22) Filed: Jul. 28, 2021

(65) Prior Publication Data

US 2022/0118912 A1 Apr. 21, 2022

(30) Foreign Application Priority Data

Oct. 20, 2020 (KR) .......................... 10-2020-0136327
Oct. 20, 2020 (KR) .......................... 10-2020-0136328

(51) Int. Cl.
  *B60R 1/12* (2006.01)
  *B60R 1/074* (2006.01)
(52) U.S. Cl.
  CPC ................ *B60R 1/12* (2013.01); *B60R 1/074* (2013.01); *B60R 2001/1253* (2013.01)

(58) Field of Classification Search
  CPC ... B60R 1/12; B60R 1/074; B60R 2001/1253; B60R 2011/004; B60R 2011/0082; B60R 2300/8046; B60R 11/04
  See application file for complete search history.

(56) References Cited

U.S. PATENT DOCUMENTS

| | | | | |
|---|---|---|---|---|
| 5,823,054 A | * | 10/1998 | Brouwer | ................ F16H 1/225 359/872 |
| 2007/0047116 A1 | * | 3/2007 | Brouwer | ................ B60R 1/074 359/877 |
| 2007/0139800 A1 | * | 6/2007 | Onuki | ..................... B60R 1/074 359/841 |
| 2021/0024011 A1 | * | 1/2021 | Sakata | ..................... B60R 1/00 |

* cited by examiner

*Primary Examiner* — Sath V Perungavoor
*Assistant Examiner* — Tyler B Edwards
(74) *Attorney, Agent, or Firm* — United One Law Group LLC; Kongsik Kim; Jhongwoo Peck

(57) ABSTRACT

A camera mirror assembly for a vehicle includes a folding unit configured to be rotated with respect to a fixed shaft formed in a base provided in the vehicle; and a support frame in which the folding unit and a camera are mounted at both ends thereof, wherein the support frame is configured to be folded or unfolded to change a position of the camera as the folding unit rotates. Further, the folding unit includes a driving housing, a driving portion, a driven gear portion fixed to the fixed shaft, and a driving force transfer portion for transferring a driving force of the driving portion to the driven gear portion.

19 Claims, 27 Drawing Sheets

CAMERA MIRROR ASSEMBLY FOR VEHICLE

CROSS-REFERENCE TO RELATED APPLICATIONS

This application claims priority to Korean Patent Application No. 10-2020-0136327 filed on Oct. 20, 2020 and No. 10-2020-0136328 filed on Oct. 20, 2020, which applications are herein incorporated by reference in their entireties.

BACKGROUND

1. Technical Field

The present disclosure relates to a camera mirror assembly for a vehicle, and more particularly, to a camera mirror assembly for a vehicle, which enables folding and unfolding of a camera mirror housing.

2. Description of the Related Art

Generally, a vehicle is equipped with an inside mirror therein to allow a driver to recognize a rear situation of the vehicle and outside mirrors in front doors at both sides of the vehicle. The driver recognizes another vehicle or a pedestrian when reversing, passing, or changing lanes via a field of vision secured by the inside mirror and/or the outside mirrors.

Recently, a vehicle is provided with a camera mirror that includes a camera, instead of an outside mirror, to reduce the possibility of breakage due to external impact and reduce air resistance when the vehicle operates. Side and rear images of the vehicle, which are acquired by the camera mirror, are displayed via a display device provided within the vehicle to allow a driver to easily recognize another vehicle or a pedestrian.

This camera mirror may be folded by the need of the driver when the driver parks the vehicle or may be temporarily folded when the vehicle passes through a narrow space. In this case, the camera mirror may be manually folded by the driver or be automatically folded using a motor, allowing the camera mirror to be folded without opening a window.

When the camera mirror is rotated to be folded or unfolded using the motor, vibration occurs due to the operation of the motor. This vibration may cause failure or breakage of the camera mirror.

Also, since the camera mirror is provided outside the vehicle, it is likely that external particles may enter the camera mirror. In this case, it is likely to cause failure or defect of the motor due to the external particles entering the camera mirror.

Therefore, a method capable of preventing external particles from entering a camera mirror while attenuating vibration caused by the operation of a motor has been required.

SUMMARY

The present disclosure has been devised to solve the above problems, and an object of the present disclosure is to provide a camera mirror assembly for a vehicle, which may attenuate vibration generated by the operation of a motor during folding and unfolding actions of a camera mirror housing.

Another object of the present disclosure is to provide a camera mirror assembly for a vehicle, which may prevent or reduce the risk of failure or defect of a motor by preventing external particles or substances from entering there.

The objects of the present disclosure are not limited to those mentioned above, and additional objects of the present disclosure, which are not mentioned herein, will be clearly understood by those skilled in the art from the following description of the present disclosure.

According to an aspect of the present disclosure, a camera mirror assembly for a vehicle may include a folding unit configured to be rotated with respect to a fixed shaft formed in a base provided in the vehicle; and a support frame in which the folding unit and a camera are respectively mounted at both ends thereof. The support frame may be configured to be folded or unfolded to change a position of the camera as the folding unit rotates. The folding unit may include a driving housing; a driving portion being seated on the driving housing and including a driving motor and a driving gear disposed on a rotational shaft of the driving motor; a driven gear portion affixed to the fixed shaft; a driving force transfer portion for transferring a driving force transferred through the driving gear to the driven gear portion; and a vibration attenuator configured to attenuate vibration generated by the driving portion. The vibration attenuator may include an elastic member mounted in a cover coupled to the driving housing and disposed to contact an end portion of the rotational shaft when the cover is coupled to the driving housing, and the elastic member may include a guide portion formed at a distal end thereof, which is extended toward the driving housing from a proximal end mounted in the cover and curved away from the end portion of the rotational shaft.

The elastic member may include a mounting portion mounted in the cover, a first extension portion extended from the mounting portion in a direction from the driving housing toward the cover, and a second extension portion extended from an end portion of the first extension portion in a direction from the cover toward the driving housing. The guide portion may be formed at an end portion of the second extension portion to be curved away from the end portion of the rotational shaft.

When the cover is coupled to the driving housing, the end portion of the rotational shaft may move along the guide portion to contact the second extension portion, and the elastic member may be elastically deformed by the end portion of the rotational shaft to allow the elastic member to apply a restoring force to the end portion of the rotational shaft. The elastic member may attenuate vibration generated along a direction of a rotational axis of the rotational shaft.

A wire may be further provided to enable transfer of a control signal for operation control of the folding unit and the camera, and the wire may be disposed along a side of the support frame. The support frame may further include a wire fixing portion inserted into an insertion groove formed at the side thereof to fix the wire.

The driving force transfer portion may include at least one gear portion including an input gear to which the driving force is input and an output gear that outputs the driving force, the input gear may be engaged with the driving gear, and the output gear may be engaged with the driven gear portion.

Further, when the support frame is rotated to a position configured for acquiring an image of a predesignated side-rear region of a vehicle, it may be determined that the support frame is completely unfolded.

According to another aspect of the present disclosure, a camera mirror assembly for a vehicle may include a folding unit configured to be rotated with respect to a fixed shaft formed in a base provided in the vehicle; and a support frame in which the folding unit and a camera are respectively mounted at both ends thereof. The support frame may be configured to be folded or unfolded to change a position of the camera as the folding unit rotates. The folding unit may include a driving housing; a driving portion being seated on the driving housing and including a driving motor and a driving gear disposed on a rotational shaft of the driving motor; a driven gear portion affixed to the fixed shaft; a first gear portion; and a second gear portion. The first gear portion may include a first shaft configured to be rotated about a first axis, a first input gear configured to be rotated with the first shaft and engaged with the driving gear, and a first output gear configured to be rotated with the first shaft and to output a driving force that is input to the first input gear. The second gear portion may include a second shaft configured to be rotated about a second axis, a second input gear configured to be rotated with the second shaft and engaged with the first output gear, and a second output gear configured to be rotated with the second shaft and to output a driving force that is input to the second input gear to the driven gear portion. Further, a reinforcing plate may be disposed between end portions of the first shaft and the second shaft and an inner surface of the driving housing, and the driving housing and a cover coupled to the driving housing may respectively include a first partition and a second partition configured to divide a space in which the first gear portion and the second gear portion are accommodated and a space in which the driving portion is accommodated.

A sealing member may be further disposed between an edge of the driving housing and an edge of the cover. A number of gear teeth of the first output gear and a number of gear teeth of the second input gear may be different. For example, the first output gear may have more gear teeth than the second input gear.

An end portion of at least one of the first partition or the second partition may include a step difference having a recessed shape to allow a driving force of the driving portion to be transferred to the driving force transfer portion.

Tooth profiles of the first output gear may be symmetrical at both sides of the first input gear, and tooth profiles of the second input gear may be symmetrical at both sides of the second output gear. The first output gear and the second input gear may include hollow holes into which the end portions of the first shaft and the second shaft are inserted, and each of the hollow holes of the first output gear and the second input gear may exhibit a non-circular shape.

The driving housing may include seating grooves into which the end portions of the first shaft and the second shaft are respectively inserted; and a mounting groove formed to be communicated with the seating grooves, allowing the reinforcing plate to be mounted therein.

Further, a retainer ring may be coupled to an end portion of the fixed shaft, and an elastic member may be disposed between the driven gear portion and the retainer ring. In particular, the fixed shaft may include at least one coupling groove formed at the end portion thereof, such that the at least one coupling groove of the fixed shaft is open toward the driven gear portion, and the retainer ring may include at least one coupling protrusion formed on an inner circumferential surface of a through hole through which the end portion of the fixed shaft passes. Accordingly, as the retainer ring is rotated while compressing the elastic member, the at least one coupling protrusion may be aligned at the at least one coupling groove of the fixed shaft, and the at least one coupling protrusion may be inserted into the at least one coupling groove by a restoring force of the elastic member.

When the support frame is rotated to a position configured for acquiring an image of a predesignated side-rear region of a vehicle, it may be determined that the support frame is completely unfolded.

The aforementioned camera mirror assembly for a vehicle of the present disclosure has one or more of the following advantageous effects. When a cover is coupled to a driving housing on which a driving motor is seated, vibration of the driving motor may be attenuated by an elastic member provided in the cover, whereby assembly may be more easily facilitated and at the same time, the vibration may be effectively attenuated, preventing failure or breakage of the driving motor. Also, since a partition formed by the driving housing and the cover may divide a space in which the driving motor is disposed, in a space formed by the driving housing and the cover, failure or defect of the driving motor caused by particles entering the driving motor may be prevented. Also, a sealing member may be disposed between edges of the driving housing and the cover, whereby external particles or substances may be prevented from entering the space formed by the driving housing and the cover.

The effects according to the embodiment of the present disclosure are not limited to those mentioned above, and more various effects are included in the following description of the present disclosure.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
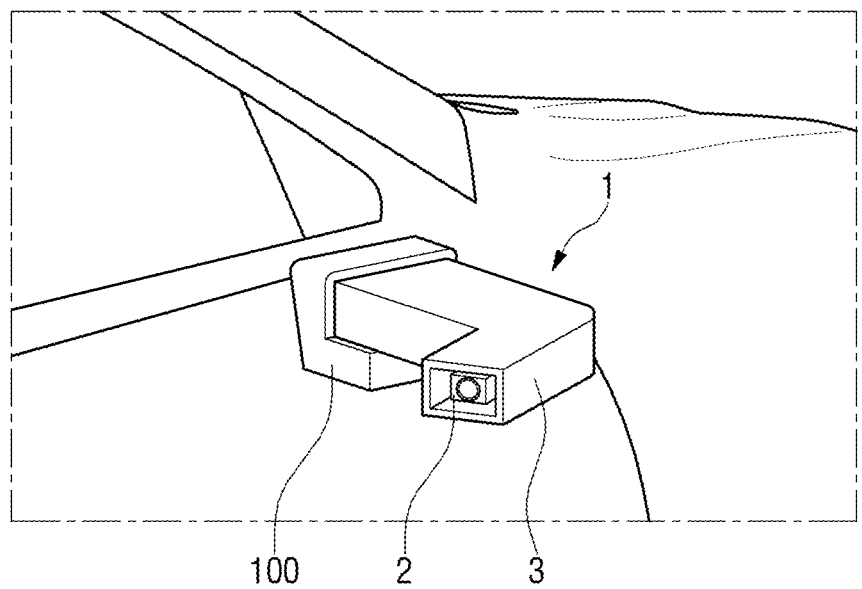
FIG. 1 is a schematic view illustrating an exterior appearance of a camera mirror assembly for a vehicle according to an exemplary embodiment of the present disclosure.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Throughout the specification, like reference numerals in the drawings denote like elements.

In some embodiments, well-known steps, structures and techniques will not be described in detail to avoid obscuring the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the invention are described herein with reference to plan and cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In the drawings, respective components may be enlarged or reduced in size for convenience of explanation.

Hereinafter, the embodiments of the present disclosure will be described with reference to the accompanying drawings illustrating a camera mirror assembly for a vehicle.

FIG. 1 is a schematic view illustrating an exterior appearance of a camera mirror assembly for a vehicle according to an embodiment of the present disclosure. Referring to FIG. 1, a camera mirror assembly 1 for a vehicle according to an embodiment of the present disclosure may include a mirror housing 3 equipped with a camera 2.

The camera mirror assembly 1 for a vehicle of the present disclosure will be described herein based on an example where it is used as an outside mirror installed on or near a front door of the vehicle to secure a side rear view of the vehicle, but the present disclosure is not limited thereto. The camera mirror assembly 1 for a vehicle of the present disclosure may be used to secure views for various directions near the vehicle.

Figure 2:
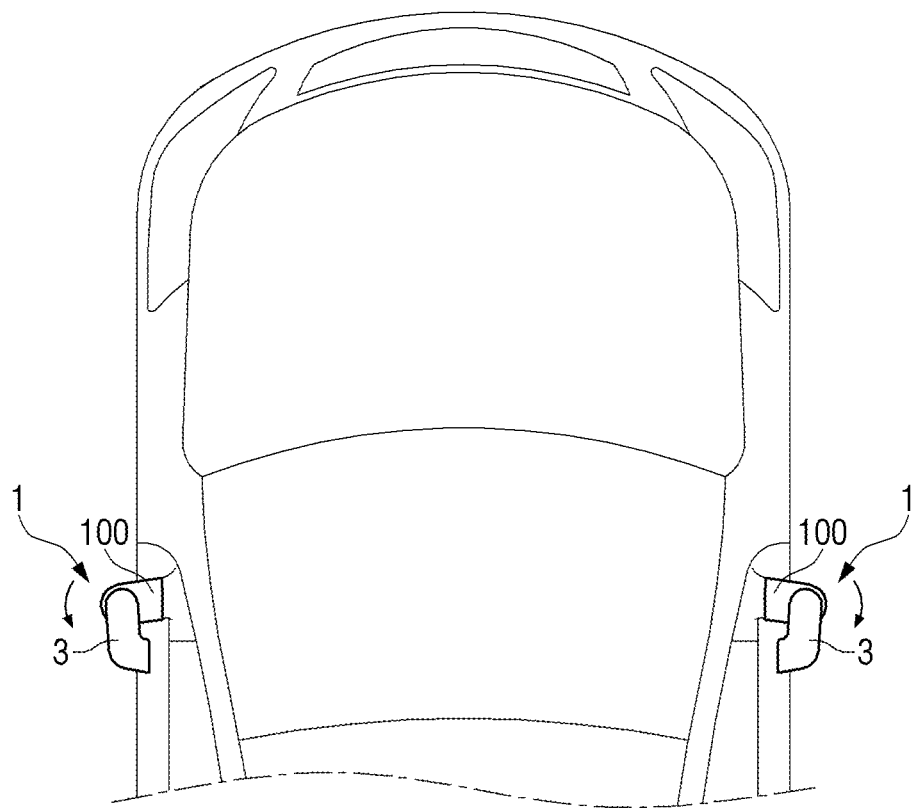
FIG. 2 is a schematic view illustrating a mirror housing of a folding state according to an exemplary embodiment of the present disclosure.
Figure 3:
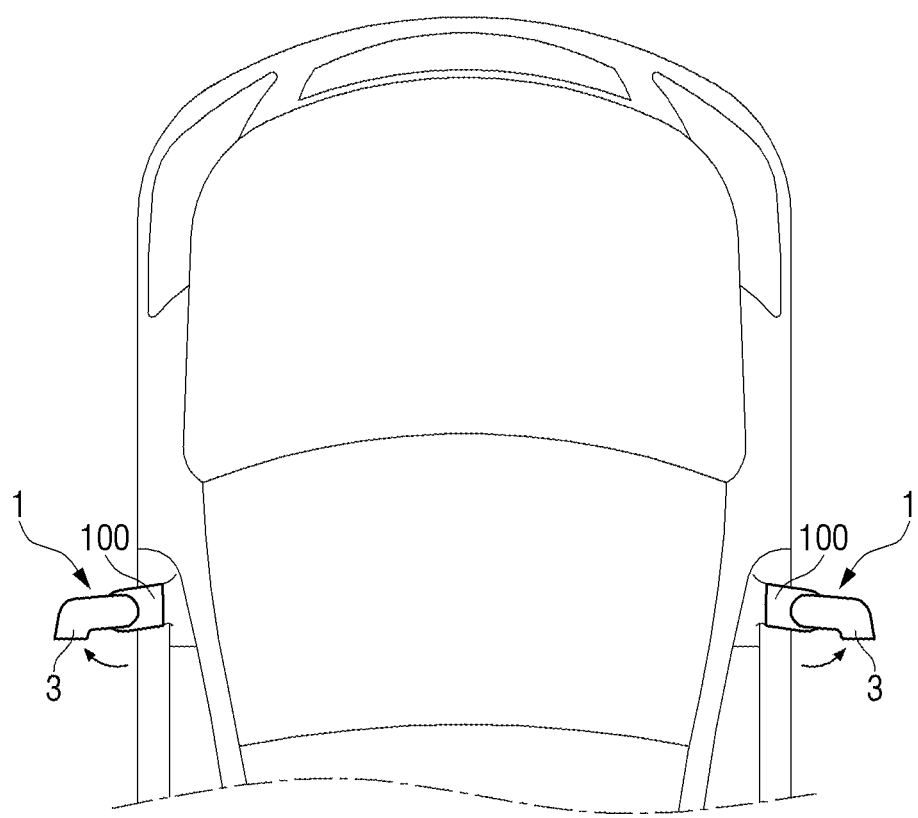
FIG. 3 is a schematic view illustrating a mirror housing of an unfolding state according to an exemplary embodiment of the present disclosure.

The camera mirror housing 3 may be folded as shown in FIG. 2 to prevent breakage caused by a minor accident, or to save a parking space when the vehicle is not operating, or may be unfolded as shown in FIG. 3 to secure a driver's view when the vehicle is operating. Hereinafter, in the embodiment of the present disclosure, the state that the camera mirror housing 3 is retracted or withdrawn will be referred to as "folding," and the state that the mirror housing 3 is deployed or extended will be referred to as "unfolding."

In this case, when the camera mirror housing 3 is unfolded to reach a position where an image of a side rear region of a vehicle, which is predesignated by laws and regulations, can be acquired, it may be understood as unfolding of the camera mirror housing 3 is completed.

In the embodiment of the present disclosure, the camera mirror housing 3 may include a camera 2 configured to acquire a side rear image of the vehicle, and the image acquired by the camera 2 may be displayed via a display device provided inside the vehicle to secure a driver's view. However, the present disclosure is not limited thereto, and the present disclosure may be similarly applied to a case where a mirror is provided instead of the camera 2.

Figure 4:
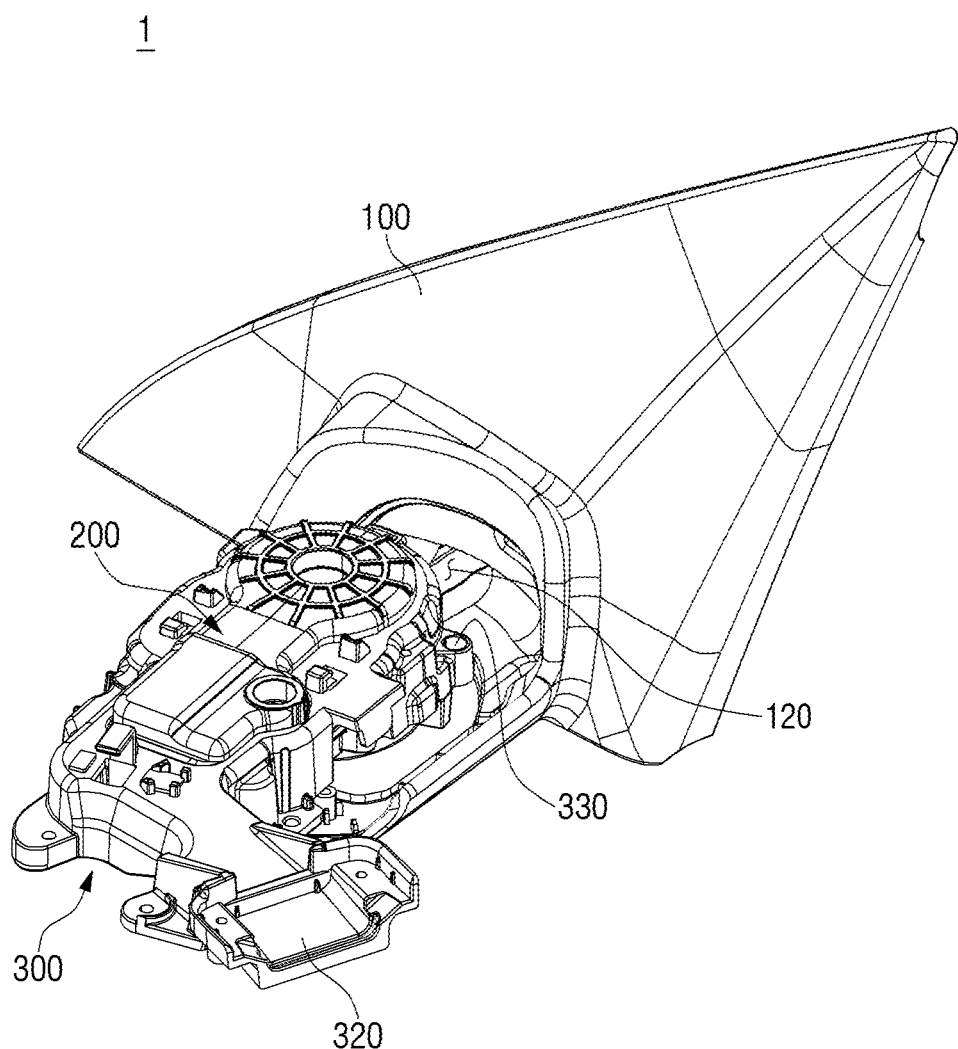
FIG. 4 is a perspective view illustrating a camera mirror assembly for a vehicle according to an exemplary embodiment of the present disclosure.
Figure 5:
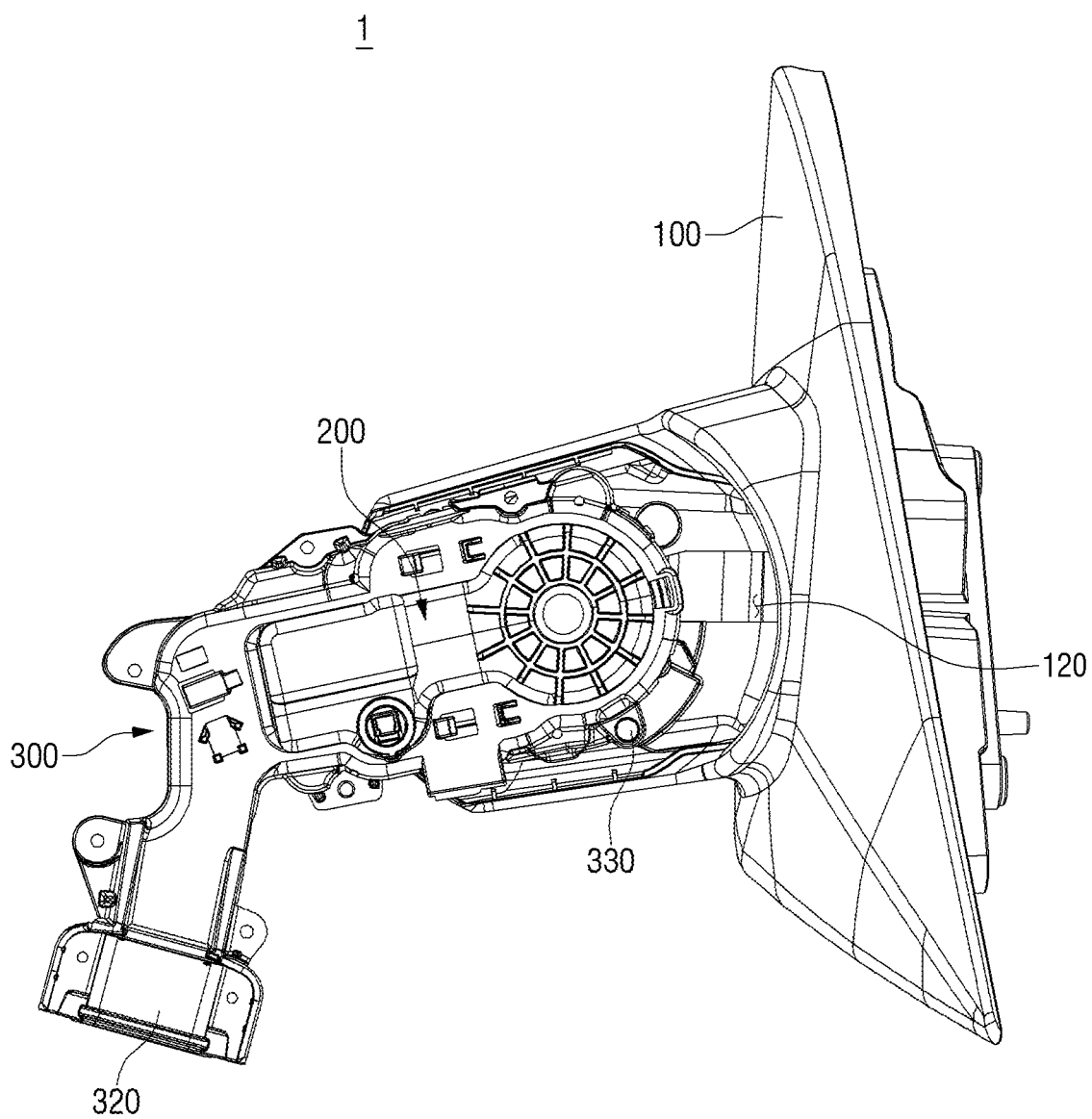
FIG. 5 is a plan view illustrating a camera mirror assembly for a vehicle according to an exemplary embodiment of the present disclosure.
Figure 6:
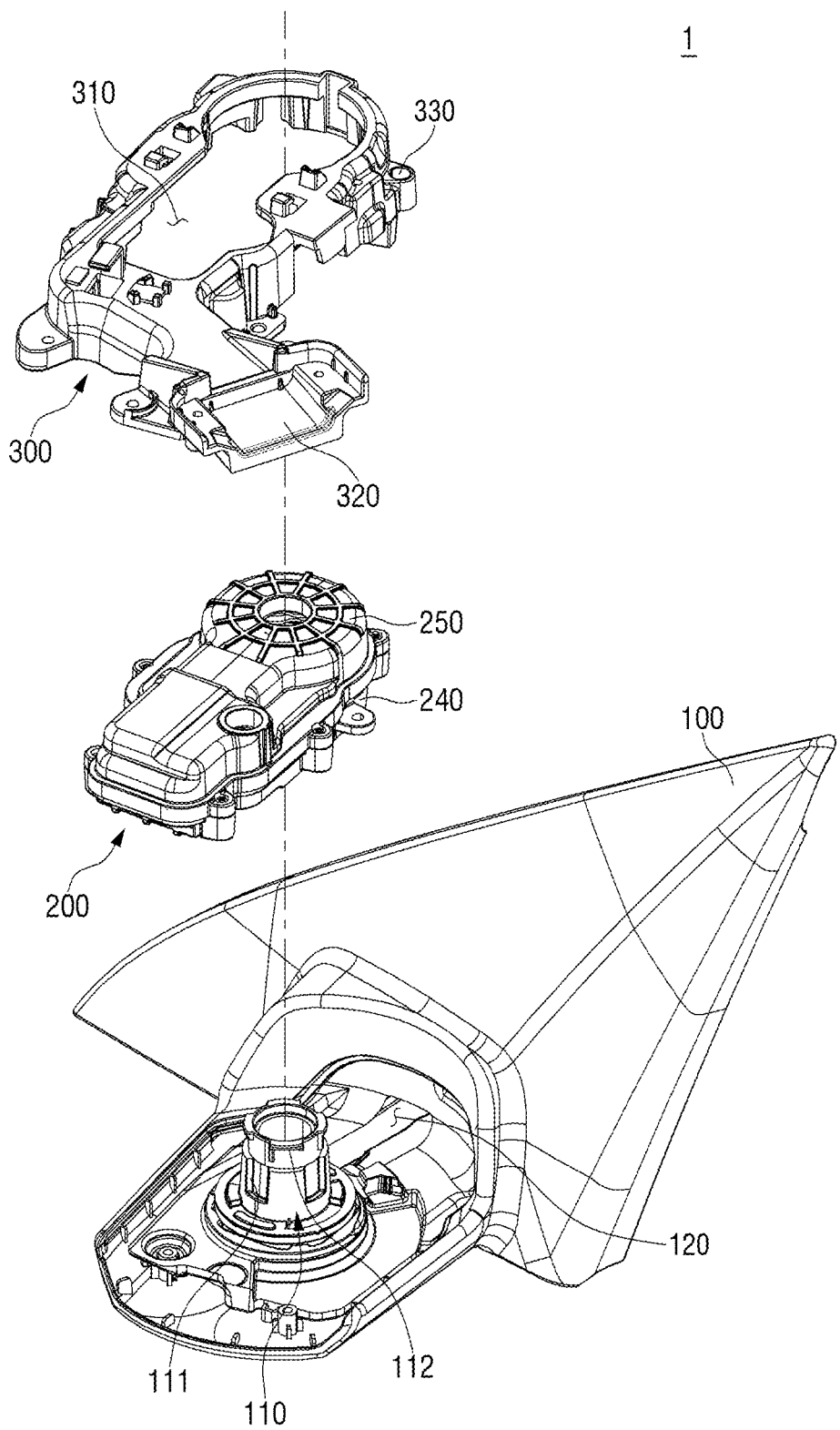
FIG. 6 is an exploded perspective view illustrating a camera mirror assembly for a vehicle according to an exemplary embodiment of the present disclosure.

FIG. 4 is a perspective view illustrating a camera mirror assembly for a vehicle according to an embodiment of the present disclosure, FIG. 5 is a plan view illustrating a camera mirror assembly for a vehicle according to an embodiment of the present disclosure, and FIG. 6 is an exploded perspective view illustrating a camera mirror assembly for a vehicle according to an embodiment of the present disclosure. For illustration purposes, FIGS. 4 to 6 are shown without the camera 2 and the camera mirror housing 3 of FIG. 1.

Referring to FIGS. 4 to 6, the camera mirror assembly 1 for a vehicle according to the embodiment of the present disclosure may include a base 100, a folding unit 200, and a support frame 300. The base 100 may be installed on or near a front door of the vehicle. The folding unit 200 may be installed to rotate with respect to a fixed shaft 110 formed in the base 100, and may serve to rotate the camera mirror housing 3 to be folded or unfolded.

The support frame 300 may include a coupling portion 310 formed at one end thereof to allow the folding unit 200 to be coupled thereto, and may include a support portion 320 formed at the other end to support the camera 2. For this reason, the folding unit 200 and the support frame 300 may be rotated together when the folding unit 200 rotates, whereby a position of the camera 2 may be changed. Also, the support frame 300 may be coupled to the camera mirror housing 3 such that the camera mirror housing 3 rotates for folding or unfolding as shown in FIGS. 2 and 3 when the folding unit 200 rotates. In other words, the camera mirror housing 3 being folded or unfolded may be understood as the support frame 300 being folded or unfolded.

Figure 7:
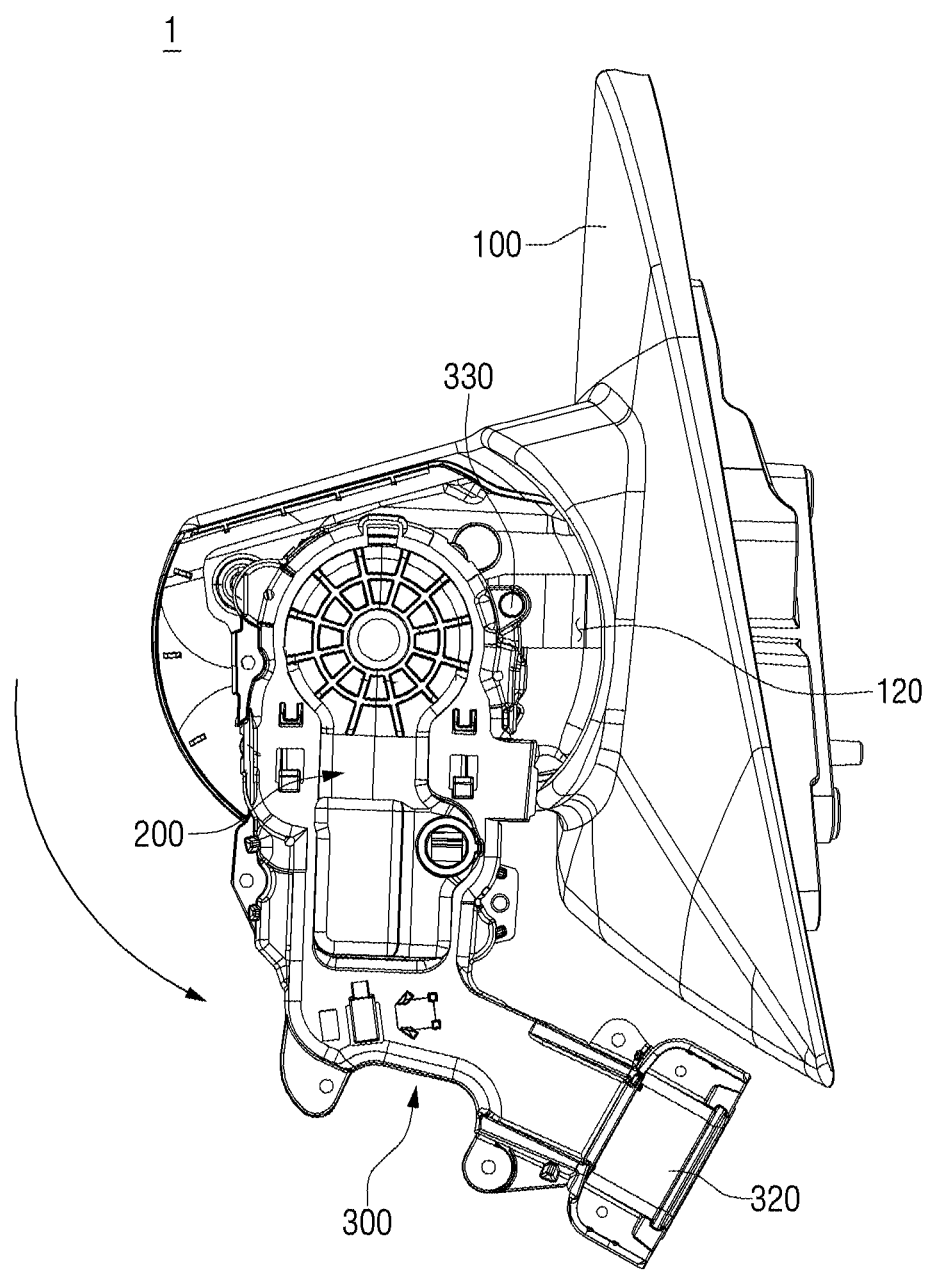
FIG. 7 is a plan view illustrating a folding unit and a support frame of a folding state according to an exemplary embodiment of the present disclosure.

FIGS. 4 to 6 show examples of the state in which the camera mirror housing 3 is unfolded, and the folding unit 200 and the support frame 300 may be rotated together with the camera mirror housing 3 as shown in FIG. 7 when the camera mirror housing 3 is folded.

Figure 8:
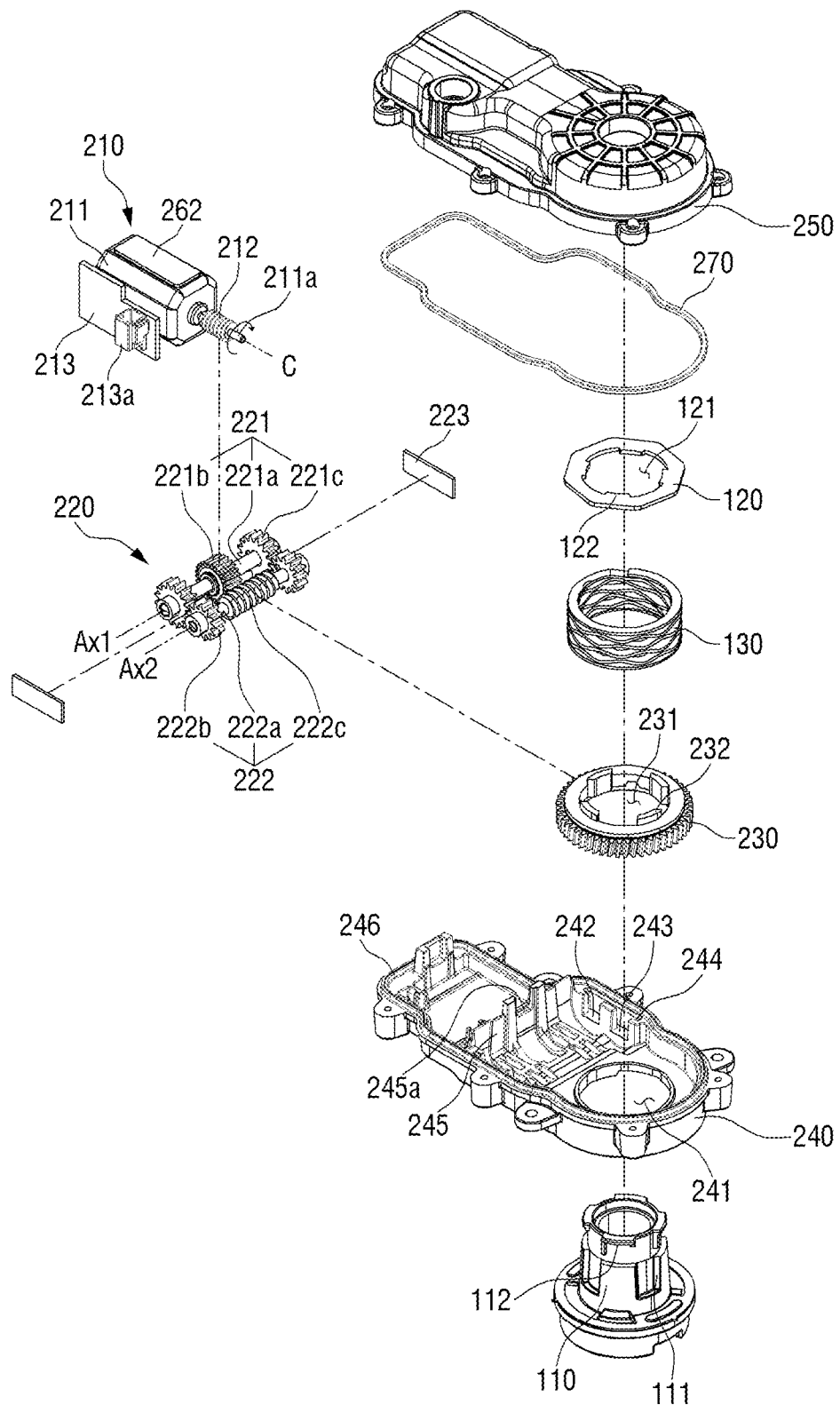
FIGS. 8 to 10 are exploded perspective views illustrating a folding unit according to an exemplary embodiment of the present disclosure.
Figure 9:
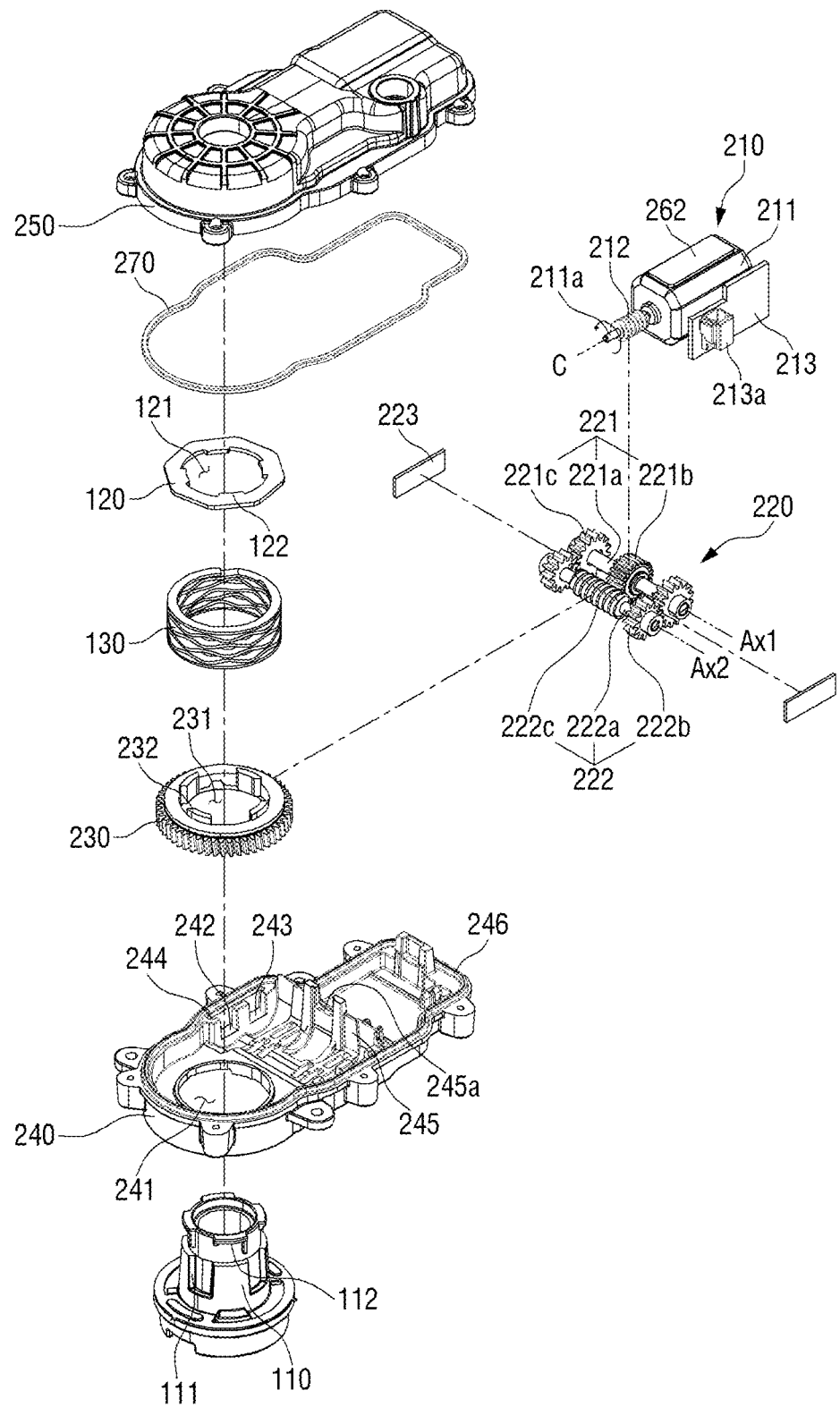
Figure 10:
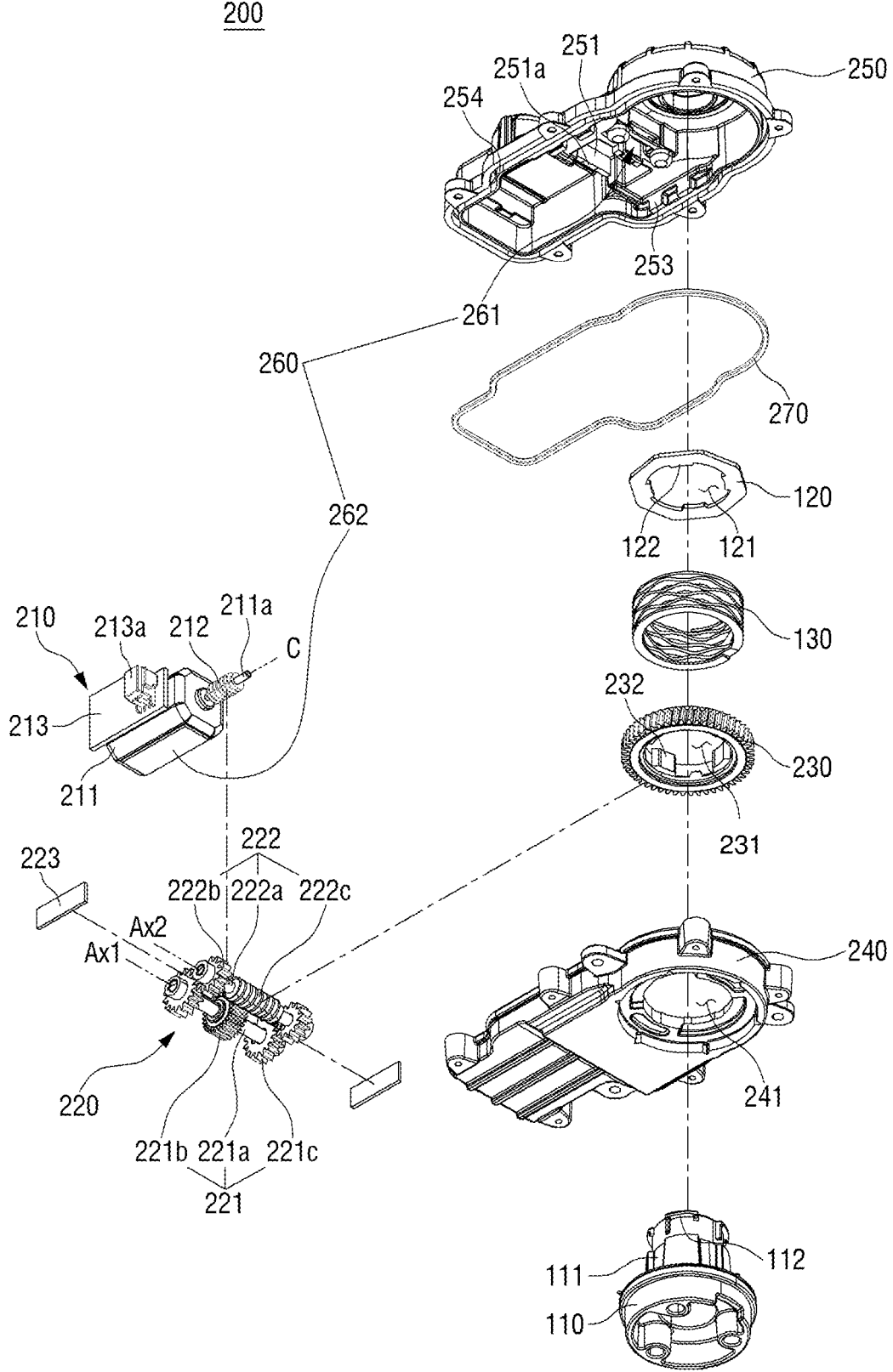
Figure 11:
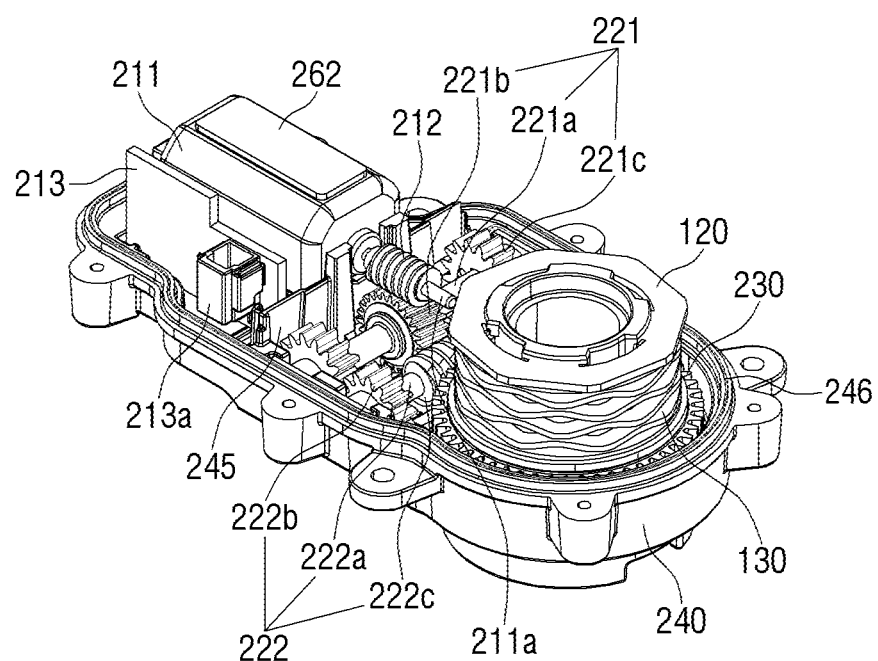
FIG. 11 is a perspective view illustrating a folding unit according to an exemplary embodiment of the present disclosure.
Figure 12:
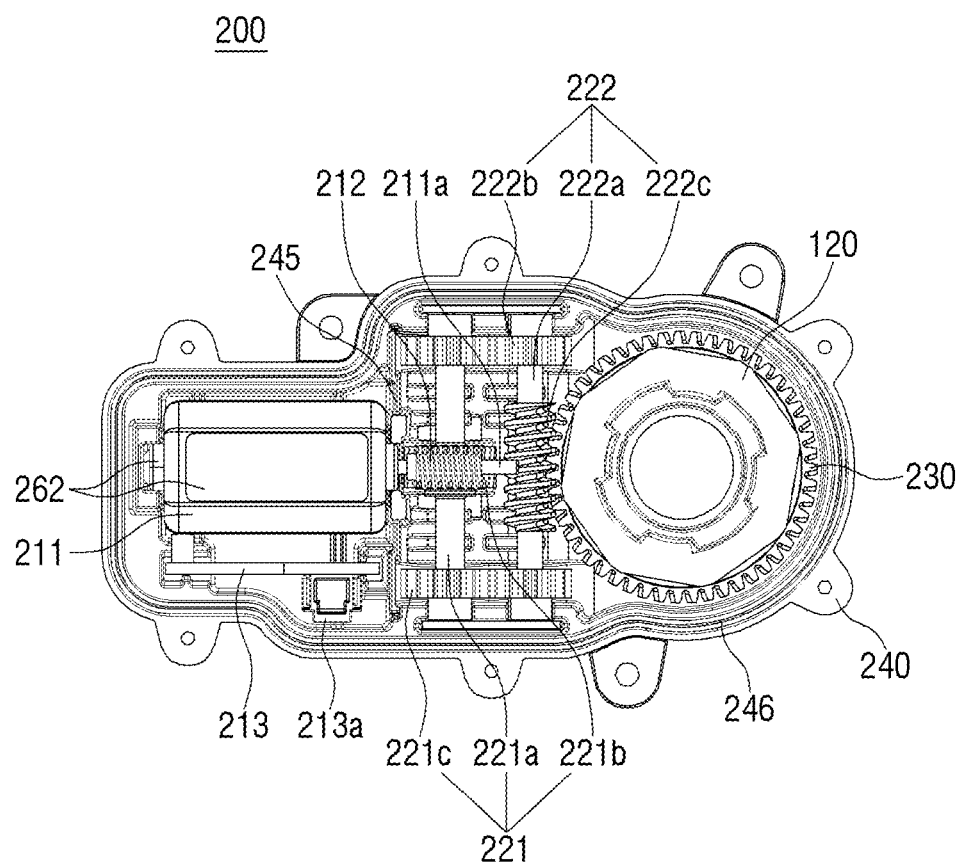
FIG. 12 is a plan view illustrating a folding unit according to an exemplary embodiment of the present disclosure.

FIGS. 8 to 10 are exploded perspective views illustrating the folding unit 200 according to an embodiment of the present disclosure, FIG. 11 is a perspective view illustrating the folding unit 200 according to an embodiment of the present disclosure, and FIG. 12 is a plan view illustrating the folding unit 200 according to an embodiment of the present disclosure. For illustration purposes, FIGS. 11 and 12 are shown without a cover 250 coupled to a driving housing 240 to allow the inside of the folding unit 200 to be seen.

Referring to FIGS. 8 to 12, the folding unit 200 according to the embodiment of the present disclosure may include a driving portion 210, a driving force transfer portion 220, and a driven gear portion 230. The driving portion 210, the driving force transfer portion 220, and the driven gear portion 230 may be disposed within an inner space formed by the driving housing 240 and the cover 250 coupled with the driving housing 240, thereby fixing their positions, protecting from external impacts, and preventing particles from entering there.

The driving portion 210 may include a driving motor 211, and a driving gear 212 coupled to a rotational shaft 211a of the driving motor 211. A driving force generated when the driving motor 211 is driven may be transferred to the driving force transfer portion 220 through the driving gear 212. In the embodiment of the present disclosure, an example where the driving gear 212 is coupled to the rotational shaft 211a is described by way of example. However, the present disclosure is not limited thereto, and the rotational shaft 211a and the driving gear 212 may be formed integrally in a single body.

A substrate 213 for power supply or operation control of the driving motor 211 may be disposed at one side of the driving motor 211, and various components including a connector 213a for power supply or operation control may be provided in the substrate 213. A rotational direction and/or a rotational speed of the rotational shaft 211a may be determined under the control of the substrate 213, and a rotational direction and/or a rotational speed of the camera mirror housing 3 may be varied depending on the rotational direction and/or the rotational speed of the rotational shaft 211a.

The driving force transfer portion 220 may transfer the driving force generated from the driving portion 210 to the driven gear portion 230 and may also provide a speed reduction for the camera mirror housing 3 to an adequate speed during folding or unfolding of the camera mirror housing 3. More specifically, the driving force transfer portion 220 may include a first gear portion 221 and a second gear portion 222, and a final reduction ratio may be determined by a reduction ratio between the driving gear 212 and the first gear portion 221, a reduction ratio between the first gear portion 221 and the second gear portion 222, and a reduction ratio between the second gear portion 222 and the driven gear portion 230.

Further, in the embodiment of the present disclosure, an example where the driving force transfer portion 220 includes the first gear portion 221 and the second gear portion 222 is described by way of example, but such an example is to assist understanding of the present disclosure. The present disclosure is not limited thereto, and the number of gear portions included in the driving force transfer portion 220 may be varied depending on a reduction ratio that is required.

Figure 13:
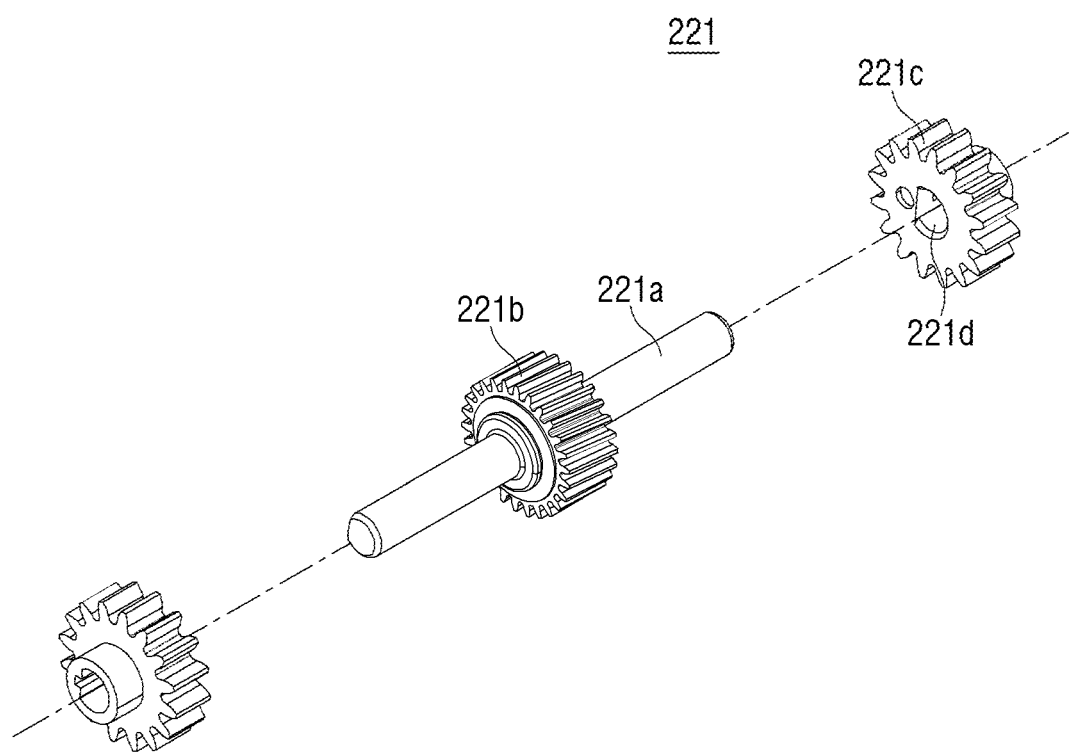
FIG. 13 is an exploded perspective view illustrating a first gear portion according to an exemplary embodiment of the present disclosure.
Figure 14:
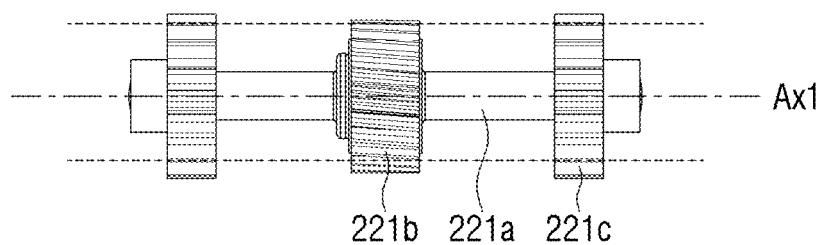
FIG. 14 is a front view illustrating a first gear portion according to an exemplary embodiment of the present disclosure.

FIG. 13 is an exploded perspective view illustrating a first gear portion according to an embodiment of the present disclosure, and FIG. 14 is a front view illustrating a first gear portion according to an embodiment of the present disclosure. Referring to FIGS. 13 and 14, the first gear portion 221 according to the embodiment of the present disclosure may include a first shaft 221a rotated about a first axis Ax1, a first input gear 221b rotated with the first shaft 221a, and a first output gear 221c disposed at both ends of the first shaft 221a and rotated with the first shaft 221a.

The first output gear 221c may include a hollow hole 221d into which each of both ends of the first shaft 221a is inserted, and the hollow hole 221d of the first output gear 221c may have a shape corresponding to a sectional shape of the end of the first shaft 221a. For example, the hollow hole 221d of the first output gear 221c may be formed to have a non-circular shape (for example, a "D" shape) with respect to the first axis Ax1, whereby tooth profiles of the first output gears 221c, which are disposed at both sides of the first input gear 221b, may be symmetrical with respect to the first input gear 221b.

The configuration that the tooth profiles of the first output gears 221c disposed at both sides of the first input gear 221b are symmetrical with respect to the first input gear 221b may provide uniform output of the driving force that is input to the first input gear 221b to the first output gears 221c that are respectively disposed at both sides of the first input gear 221b.

Dotted lines of FIG. 14 denote lines connecting tooth ends (e.g., crests) of gear teeth of the first output gears 221c respectively disposed at both sides of the first input gear 221b. When tooth profiles of the first output gears 221c respectively disposed at both sides of the first input gear 221b are symmetrical with respect to the first input gear 221b, the lines connecting the tooth ends of the gear teeth of the first output gears 221c respectively disposed at both sides of the first input gear 221b may be formed to be parallel with the first axis Ax1.

In case the hollow hole 221d of the first output gear 221c is a circle, it may be difficult to align the tooth profiles of the first output gears 221c to be symmetrical. Conversely, in the embodiment of the present disclosure, since the hollow hole 221d of the first output gear 221c has a non-circular shape, the configuration that both ends of the first shaft 221a are inserted into the hollow holes 221d of the first output gears 221c disposed at both sides of the first input gear 221b may allow the tooth profiles of the first output gears 221c to be symmetrical, and facilitate easier assembly.

In the embodiment of the present disclosure, an example where a rotational axis C of the rotational shaft 211a and the first axis Ax1 of the first gear portion 221 are perpendicular to each other is described by way of example. However, the present disclosure is not limited thereto, and an angle between the rotational axis C of the rotational shaft 211a and the first axis Ax1 of the first gear portion 221 may be varied depending on a structure of the driving force transfer between the rotational shaft 211a and the first gear portion 221.

Figure 15:
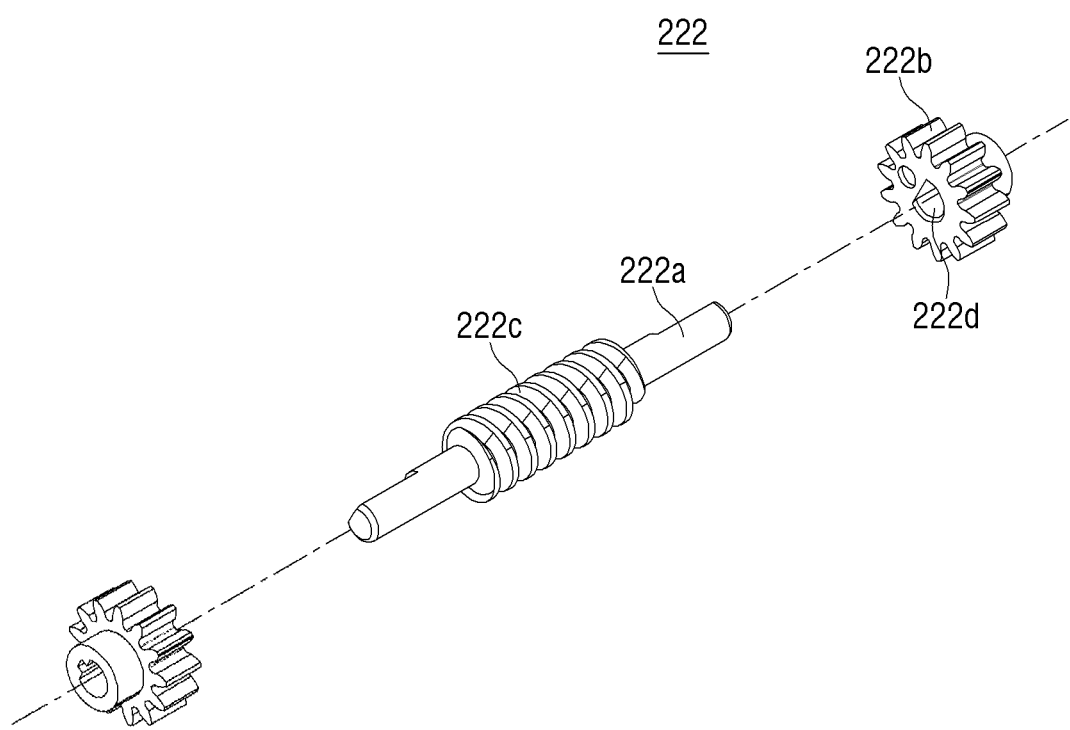
FIG. 15 is an exploded perspective view illustrating a second gear portion according to an exemplary embodiment of the present disclosure.
Figure 16:
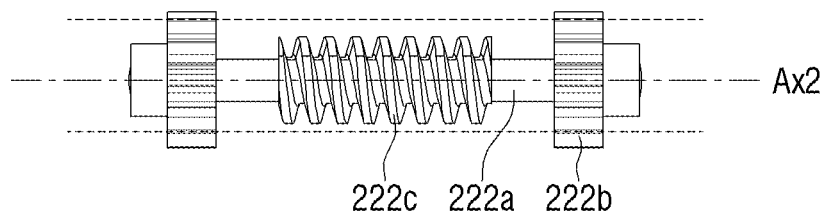
FIG. 16 is a front view illustrating a second gear portion according to an exemplary embodiment of the present disclosure.

FIG. 15 is an exploded perspective view illustrating a second gear portion according to an embodiment of the present disclosure, and FIG. 16 is a front view illustrating a second gear portion according to an embodiment of the present disclosure. Referring to FIGS. 15 and 16, the second gear portion 222 according to the embodiment of the present disclosure may include a second shaft 222a rotated about a second axis Ax2 that is parallel with the first axis Ax1, a second input gear 222b provided at each of both ends of the second shaft 222a and rotated about the second axis Ax2, and a second output gear 222c disposed between both ends of the second shaft 222a and rotated about the second axis Ax2.

The second input gear 222b may be engaged with the first output gear 221c and may receive the driving force of the driving portion 210 through the first gear portion 221. The second output gear 222c may be engaged with the driven gear portion 230 provided at the fixed shaft 110 and may transfer the driving force transferred through the first gear portion 221 to the driven gear portion 230.

For a similar reason as the aforementioned first output gears 221c, the second input gears 222b respectively disposed at both sides of the second output gear 222c may be formed such that the hollow holes 222d into which both ends of the second shaft 222a are respectively inserted are non-axisymmetric about the second axis Ax2.

The dotted lines of FIG. 16 denote lines connecting tooth ends (e.g., crests) of gear teeth of the second input gears 222b that are respectively disposed at both sides of the second output gear 222c. When tooth profiles of the second input gears 222b respectively disposed at both sides of the second output gear 222c are symmetrical, the lines connecting the tooth ends of the gear teeth of the second input gears 222b may be formed to be parallel with the second axis Ax2.

Figure 17:
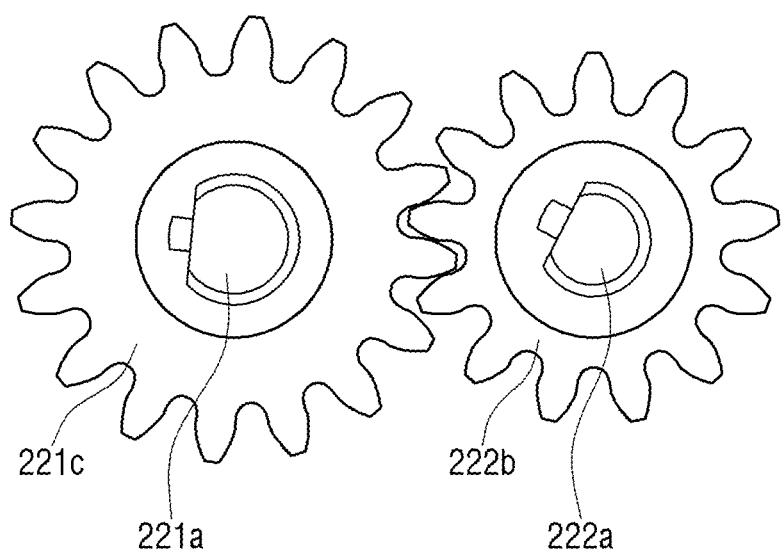
FIG. 17 is a side view illustrating gear teeth of a first output gear and a second input gear according to an exemplary embodiment of the present disclosure.

In the first gear portion 221 and the second gear portion 222, which are described above, the first and second output gears 221c and 222b disposed to be engaged with each other may have their respective gear teeth different from each other as shown in FIG. 17. This configuration may provide a speed reduction to the camera mirror housing 3 to allow it to be rotated at an adequate speed. In the embodiment of the present disclosure, an example where the first output gear 221c includes more gear teeth than the second input gear 222b is described by way of example although other configurations are also possible.

A final reduction ratio due to the aforementioned driving force transfer portion 220 may be defined by a reduction ratio between the driving gear 212 and the first input gear 221b, a reduction ratio between the first output gear 221c and the second input gear 222b, and a reduction ratio between the second output gear 222c and the driven gear portion 230.

The driven gear portion 230 may be affixed to the fixed shaft 110 formed in the base 100, and may include a hollow hole 231 through which an end of the fixed shaft 110 passes.

At least one fixed protrusion 232 may be formed on an inner circumferential surface of the hollow hole 231 of the driven gear portion 230, and may be positioned to be inserted into at least one fixed groove 111 formed on an outer circumferential surface of the fixed shaft 110, whereby the driven gear portion 230 may be affixed to the fixed shaft 110 without being rotated. This coupling configuration may be similar to spline-coupling or key-coupling.

When the driven gear portion 230 is fixed to the fixed shaft 110 and the driving force generated from the driving portion 210 is transferred to the driven gear portion 230 through the driving force transfer portion 220, the folding unit 200 may be rotated. Accordingly, the camera mirror housing 3 coupled with the support frame 300 may be rotated, allowing it to be folded or unfolded.

A nut member (herein also referred to as a retainer ring) 120 may be coupled to an end portion of the fixed shaft 110, and an elastic member 130 may be disposed between the driven gear portion 230 and the nut member 120. The nut member 120 may include a through hole 121 formed to allow the end portion of the fixed shaft 110 to pass therethrough, and at least one coupling protrusion 122 may be formed on an inner circumferential surface of the through hole 121 and may be protruded toward the center of the through hole 121.

In the embodiment of the present disclosure, description will be provided for an example in which a plurality of coupling protrusions 122 are formed on the inner circumferential surface of the through hole 121 of the nut member 120 at a predetermined interval, and a plurality of coupling grooves 112 are formed at the end portion of the fixed shaft 110 at a predetermined interval.

In particular, since each of the plurality of coupling grooves 112 includes an opening formed at a side that faces the driven gear portion 230, the plurality of coupling protrusions 122 of the nut member 120 may be inserted into corresponding coupling grooves 112 formed on the fixed shaft 100 by a restoring force of the elastic member 130. The coupling may be obtained by applying a force to the nut member 120 in a compressing direction of the elastic member 130 while the elastic member 130 is pressing the driven gear portion 230, and subsequently rotating the nut member 120. Consequently, the folding unit 200 may be coupled to the fixed shaft 110.

Figure 18:
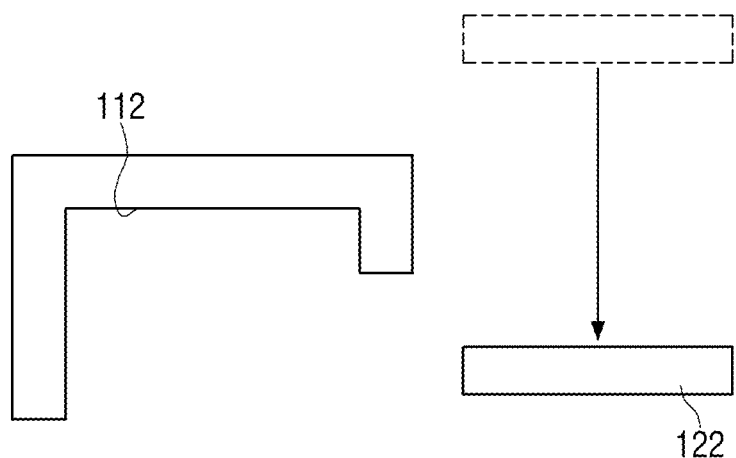
FIGS. 18 to 20 are schematic views illustrating a coupling process of a retainer ring according to an exemplary embodiment of the present disclosure.
Figure 19:
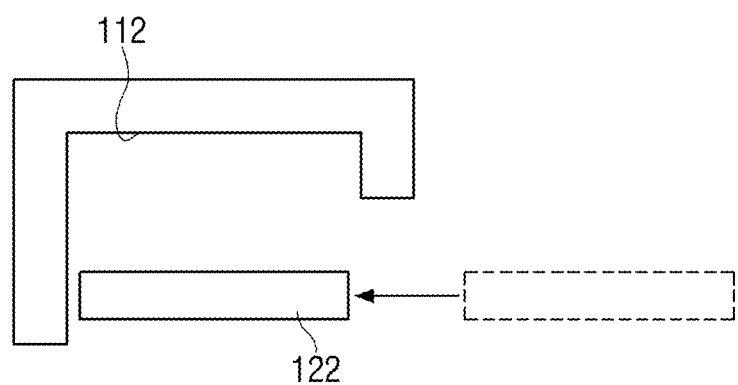
Figure 20:
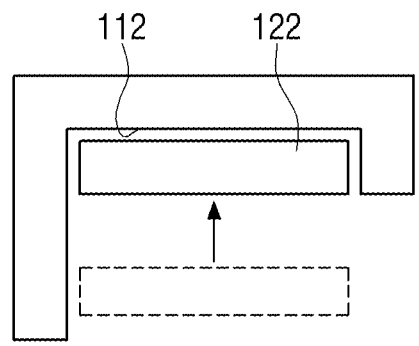

In other words, referring to FIGS. 18 to 20, when a force is applied to the nut member 120 in a compressing direction of the elastic member 130 to move the nut member 120 (FIG. 18), the plurality of coupling protrusions 122 of the nut member 120 may be moved under the plurality of coupling grooves 112 between adjacent coupling grooves 112. When the nut member 120 is rotated while the plurality of coupling protrusions 122 are maintained under the plurality of coupling grooves 112, as shown in FIG. 19, the plurality of coupling protrusions 122 may be respectively aligned at the opening of the corresponding coupling grooves 112. In this state, by removing the compressing force applied to the nut member 120, as shown in FIG. 20, the plurality of coupling protrusions 122 may be inserted into the corresponding coupling grooves 122 due to the restoring force of the elastic member 130.

FIGS. 18 to 20 illustrate one of the plurality of coupling protrusions 122 of the nut member 120 corresponds to one of the plurality of coupling grooves 112 of the fixed shaft 110. It may be understood that FIGS. 18 to 20 illustrate movement and rotation of the coupling protrusion 122 by the movement and rotation of the nut member 120.

In the embodiment of the present disclosure, an example where a wave spring is used as the elastic member 130 is described by way of example. However, the present disclosure is not limited thereto, and various types of springs may be used such that the elastic member may be compressed by the force applied to the nut member 120, and at least one coupling protrusion 122 of the nut member 120 may be inserted into at least one coupling groove 112 of the fixed shaft 110 when the force applied to the nut member 120 is removed.

The driving portion 210, the driving force transfer portion 220, and the driven gear portion 230, which have been described above, may be seated on the driving housing 240, such that their positions may be fixed. When the cover 250 is coupled to the driving housing 240, the coupling of the driving housing 240 and the cover 250 may protect the camera mirror 1 from external impacts and particles.

In the embodiment of the present disclosure, description is provided for an example in which the driving housing 240 is disposed below the cover 250 for seating of the driving portion 210, the driving force transfer portion 220, and the driven gear portion 230, and the driving housing 240 and the cover 250 are coupled to each other in the up-and-down direction. However, the present disclosure is not limited thereto, and a coupling direction of the driving housing 240 and the cover 250 may be varied depending on the position of the folding unit 200 or the like.

Figure 21:
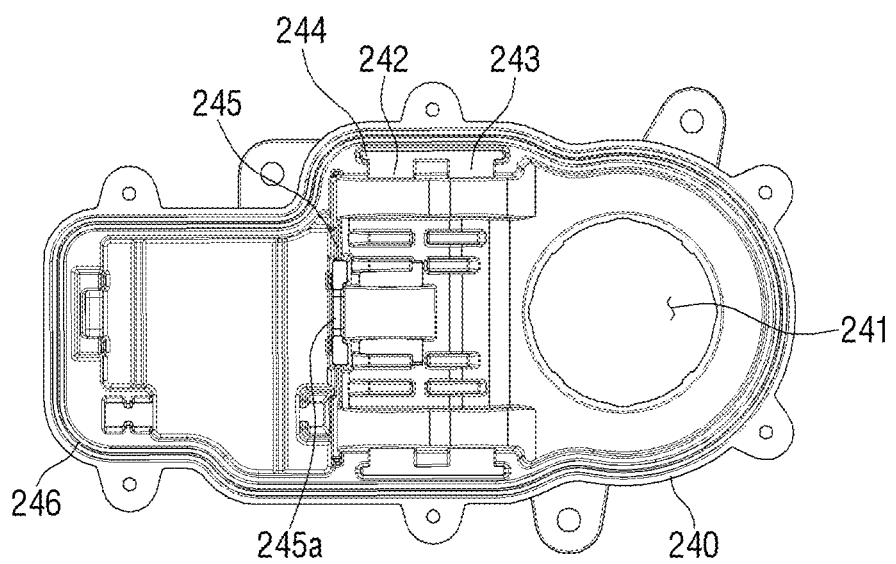
FIG. 21 is a plan view illustrating a driving housing according to an exemplary embodiment of the present disclosure.

FIG. 21 is a plan view illustrating a driving housing 240 according to an embodiment of the present disclosure. Referring to FIG. 21, the driving housing 240 according to the embodiment of the present disclosure may be formed such that it is open toward a direction to be coupled with the cover 250, that is, an upper surface in this example, and may include a pass through hole 241 through which the end portion of the fixed shaft 110 passes. The nut member 120 may be coupled to the end portion of the fixed shaft 110, which has passed through the pass through hole 241, whereby the folding unit 200 may be coupled to the fixed shaft 110.

The driving housing 240 may include a pair of first seating groves 242 and a pair of second seating grooves 243 on which both ends of the first and second shafts 221a and 222a are respectively seated. Further, the first and second seating grooves 242 and 243 may be formed to be communicated with a mounting groove 244 in which a metal-based reinforcing plate 223 having a high hardness may be mounted, thereby preventing or reducing wear that may be caused by friction between both ends of the first and second shafts 221a and 222a and an inner surface of the driving housing 240.

The driving housing 240 may include a first partition 245 formed to be protruded toward the cover 250 between the driving portion 210 and the driving force transfer portion 220, and the cover 250 may include a second partition 251 formed to be protruded toward the driving housing 240 such that at least a portion thereof adjoins the first partition 245 formed in the driving housing 240.

In particular, the first partition 245 and the second partition 251 may serve as shielding walls that divide the spaces in which the driving portion 210 and the driving force transfer portion 220 are accommodated. The shielding walls may prevent a lubricant oil, which is injected to facilitate rotation of the driving force transfer portion 220 and the driven gear portion 230 and to reduce wear thereof, from entering the driving portion 210. Accordingly, failure or defect of the driving portion 210, which is caused by inflow of the lubricant oil, may be prevented.

Step difference portions 245a and 251a having a recessed shape may be formed in an end portion of at least one of the first partition 245 or the second partition 251 to transfer the driving force of the driving portion 210 to the driving force transfer portion 220. For this reason, the rotational shaft 211a of the driving motor 211 may be disposed to pass through the space formed by the step difference portions 245a and 251a, and thus the driving force transfer portion 220 may receive the driving force through the driving gear 212.

In the embodiment of the present disclosure, an example where the step difference portions 245a and 251a are respectively formed at the end portions of both the first partition 245 and the second partition 251 is provided by way of example. However, the present disclosure is not limited thereto, and the step difference portions 245a and 251a may be formed in the end portion of at least one of the first partition 245 or the second partition 251.

Further, the folding unit 200 may include a vibration attenuator 260 that attenuates vibration generated when the driving portion 210 operates. The vibration attenuator 260 may prevent failure or breakage of the folding unit 200, which may be caused by vibration due to the operation of the driving motor 211. In the embodiment of the present disclosure, an example where the vibration attenuator 260 serves to attenuate vibration generated in a direction of the rotational axis C of the rotational shaft 211a and a direction perpendicular to the rotational axis C will be described by way of example.

Figure 24:
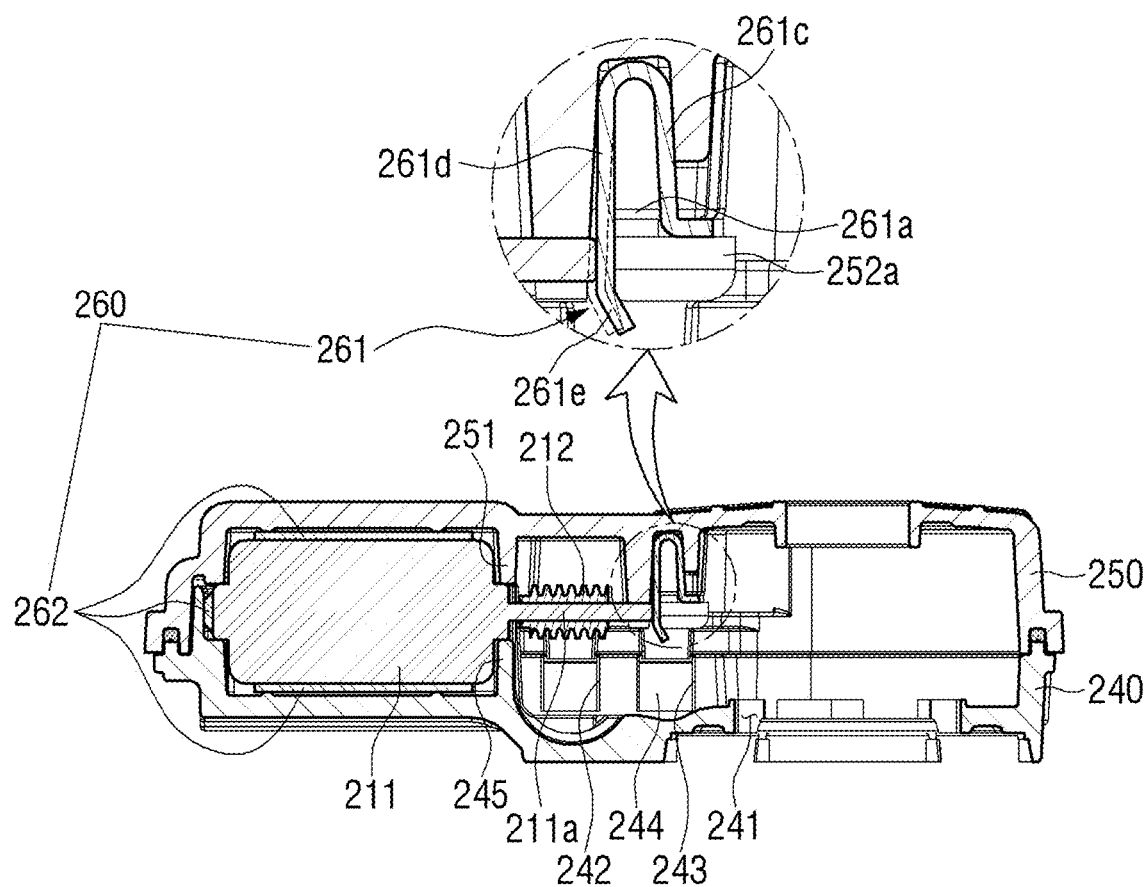
FIG. 24 is a sectional view illustrating an elastic member that is in contact with a rotational shaft of a driving motor according to an exemplary embodiment of the present disclosure.

Referring to FIG. 24, the vibration attenuator 260 may include an elastic member 261 disposed to contact the end portion of the rotational shaft 211a to apply a pressure to the end portion of the rotational shaft 211a, and a vibration absorption member 262 disposed on at least one side of the driving motor 211.

Figure 22:
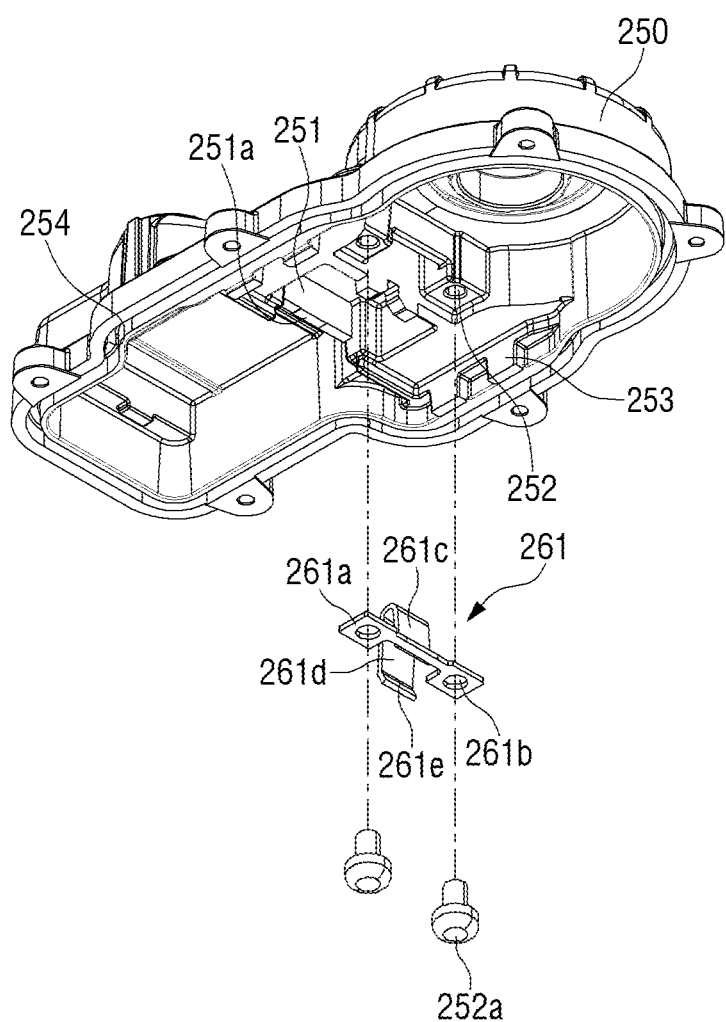
FIG. 22 is an exploded perspective view illustrating a cover according to an exemplary embodiment of the present disclosure.
Figure 23:
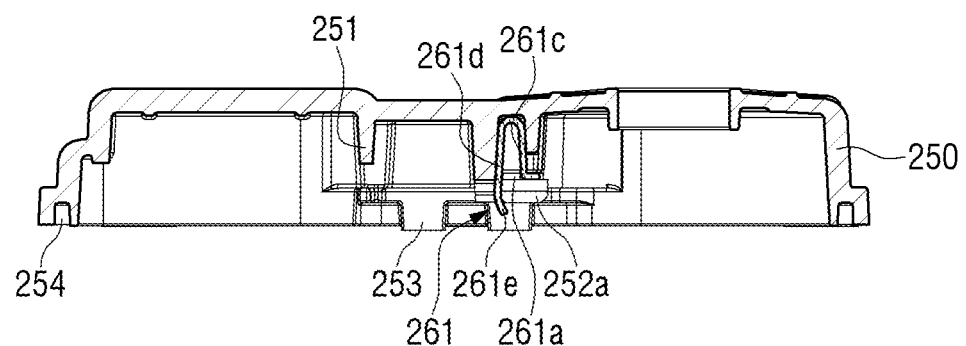
FIG. 23 is a sectional view illustrating a cover according to an exemplary embodiment of the present disclosure.

FIG. 22 is an exploded perspective view illustrating a cover according to an embodiment of the present disclosure, and FIG. 23 is a sectional view illustrating a cover according to an embodiment of the present disclosure. Referring to FIGS. 22 and 23, the elastic member 261 according to the embodiment of the present disclosure may be mounted in the cover 250 that is coupled to the driving housing 240. In this case, coupling the cover 250 provided with the elastic member 261 to the driving housing 240 may allow the elastic member 261 to be disposed to contact the end portion of the rotational shaft 211a, whereby assembly may be facilitated.

The elastic member 261 may include a mounting portion 261a formed at one end, and the mounting portion 261a of the elastic member 261 may include a fastening hole 261b through which a fastening member 252a is fastened to a fastening groove 252 of the cover 250, whereby the elastic member 261 may be coupled to the cover 250. The elastic member 261 may include a first extension portion 261c that is extended from the mounting portion 261a away from the driving housing 240, and a second extension portion 261d that is extended from an end portion of the first extension portion 261c toward the driving housing 240. A guide portion 261e that is curved (e.g., bent) away from the end portion of the rotational shaft 211a may be formed at an end portion of the second extension portion 261d.

The guide portion 261e may prevent interference between the elastic member 261 and the rotational shaft 211a due to the end portion of the rotational shaft 211a when the cover 250 is coupled to the driving housing 240. In this case, as shown in FIG. 24, the end portion of the rotational shaft 211a of the driving portion 210 may move along the guide portion 261e and may be disposed to contact the second extension portion 261d. In this case, as the elastic member 261 may be elastically deformed, the elastic member 261 may not only contact the end portion of the rotational shaft 211a but also generate a certain restoring force toward the end portion of the rotational shaft 211a, and therefore vibration may be attenuated more effectively. To illustrate, a dotted line of FIG. 24 denotes a position of the elastic member 261 before the elastic deformation, and is intended to denote a difference with a position of the elastic member 261 after the elastic deformation by the end portion of the rotational shaft 211a.

The vibration absorption member 262 may be disposed on at least one side of the driving motor 211, and vibration generated in at least one of the direction of the rotational axis C of the rotational shaft 211a or the direction perpendicular thereto may be attenuated depending on the position of the vibration absorption member 262. For example, when the vibration absorption member 262 is disposed at an opposite side of the elastic member 261 in the driving motor 211 in the direction of the rotational axis C of the rotational shaft 211a, the vibration absorption member 262 may attenuate the vibration generated in the direction of the rotational axis C of the rotational shaft 211a together with the elastic member 261. When the vibration absorption member 262 is disposed on at least one side of the driving motor 211 in the direction perpendicular to the rotational axis C of the rotational shaft 211a, the vibration absorption member 262 may attenuate the vibration generated in the direction perpendicular to the rotational axis C of the rotational shaft 211a.

In the embodiment of the present disclosure, as shown in FIG. 24, the vibration absorption member 262 may be disposed at an opposite side from the elastic member 261 in the driving motor 211 as well as upper and lower sides of the driving motor 211. However, the example is provided to assist understanding of the present disclosure. The present disclosure is not limited thereto, and the vibration absorption member may be provided in various positions that are required to attenuate vibration. The vibration absorption member 262 may be made of a material that may attenuate vibration, such as rubber or silicone, and may be attached to at least one side of the driving motor 211 with an adhesive or an adhesive tape.

When the cover 250 is coupled to the driving housing 240, the cover 250 may include a pressing member 253 formed to apply a pressure to one side of the reinforcing plate 223 inserted into the mounting groove 244 of the driving housing 240. The pressing member 253 may be disposed to contact one side of the reinforcing plate 223 when the cover 250 is coupled to the driving housing 240, and thus may serve to fix the reinforcing plate 223.

When the driving housing 240 and the cover 250 are coupled to each other, since particles or substances such as external water or dust may enter due to the manufacturing tolerances of the driving housing 240 and the cover 250, a means to prevent the particles from entering the driving housing 240 and the cover 250 may be included. In the embodiment of the present disclosure, a sealing member 270 exhibiting a closed curve shape may be disposed between an edge of the driving housing 240 and an edge of the cover 250, such that external particles are prevented from entering the folding unit 200.

In the embodiment of the present disclosure, the edge of the driving housing 240 may be inserted into the edge of the cover 250 to form an alignment groove 254 that is provided to align a coupling position of the driving housing 240 and the cover 250. Before the edge of the driving housing 240 is inserted into the alignment groove 254 formed at the edge of the cover 250, the sealing member 270 may be disposed within the alignment groove 254 formed at the edge of the cover 250, and the edge of the driving housing 240 may be inserted into the alignment groove 254 formed at the edge of the cover 250. Accordingly, the sealing member 270 may be affixed to the edge of the driving housing 240 and the edge of the cover 250 to prevent external particles from entering the folding unit 200.

Figure 25:
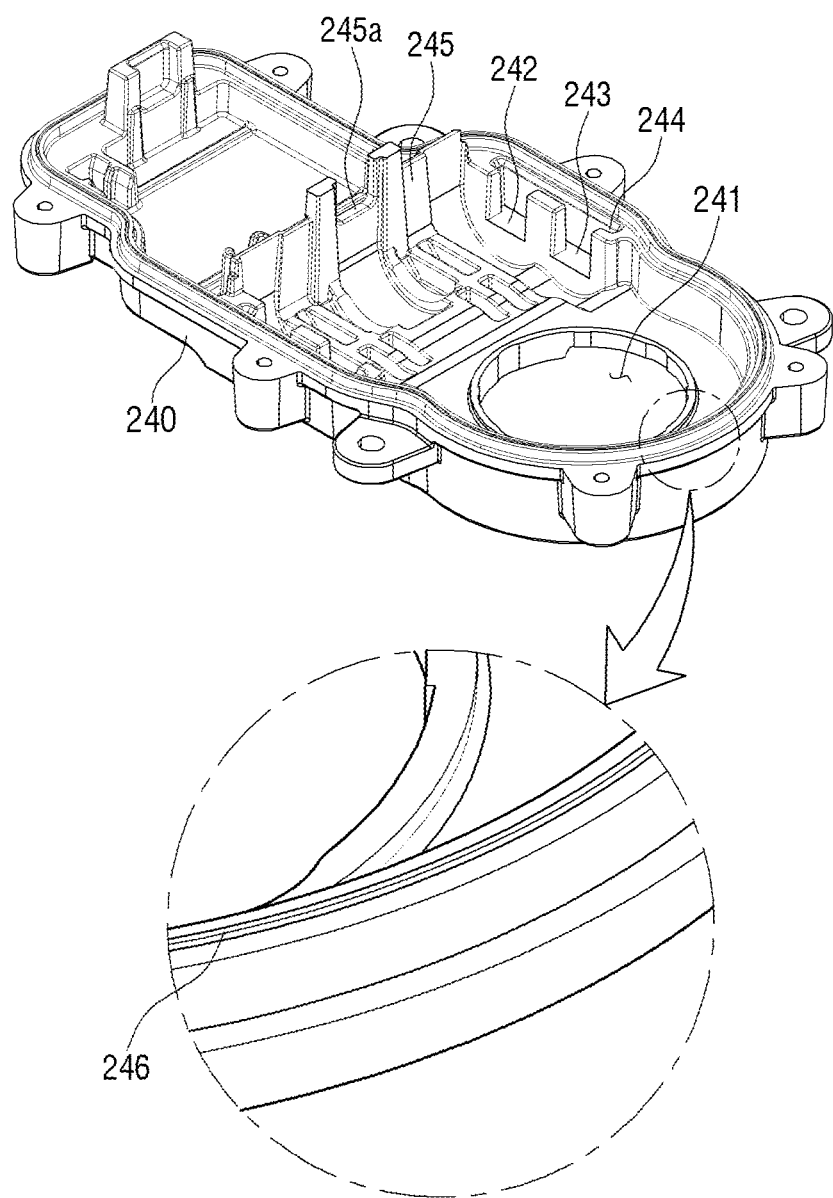
FIG. 25 is a perspective view illustrating a protrusion formed in an edge of a driving housing according to an exemplary embodiment of the present disclosure.
Figure 26:
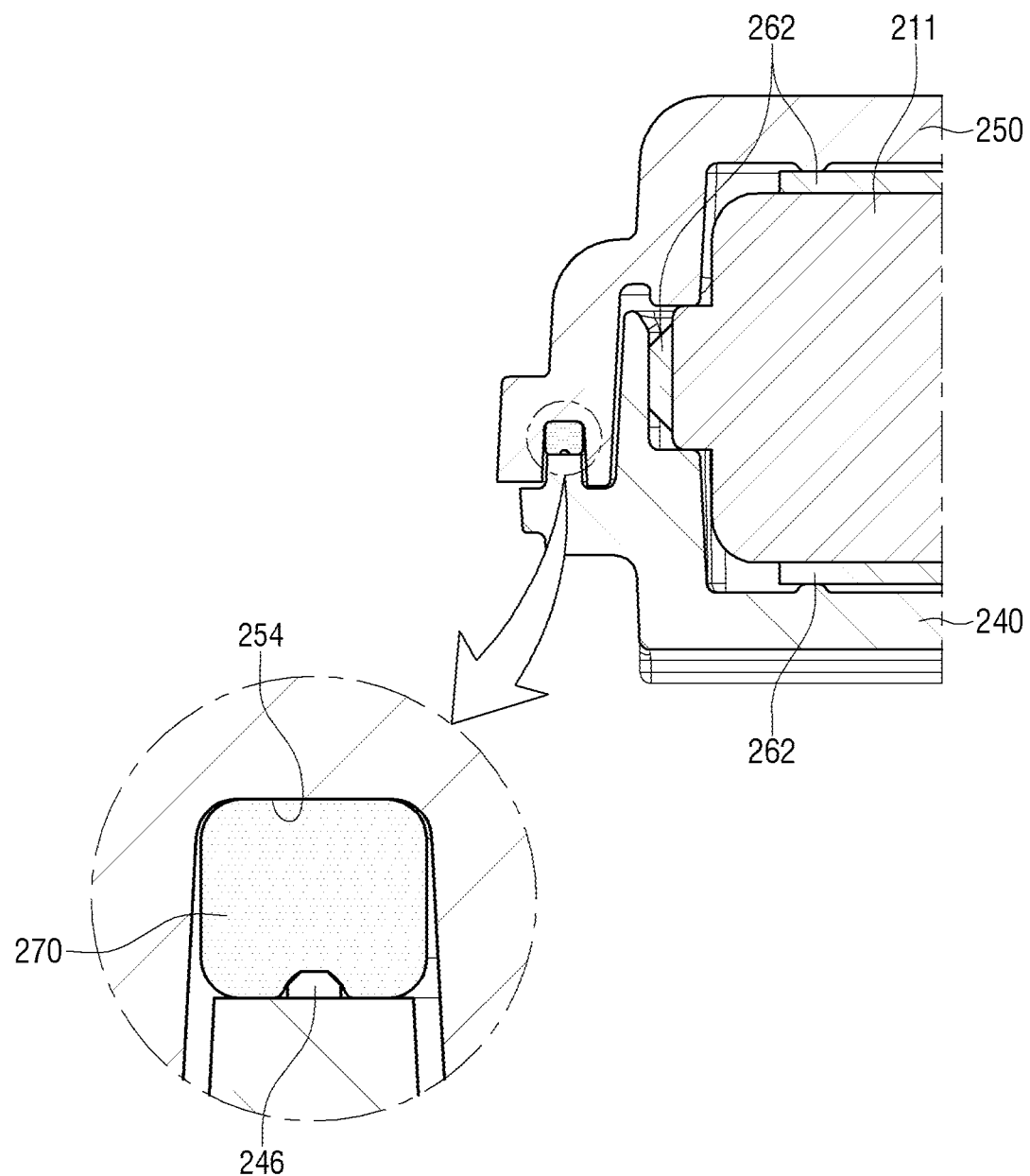
FIG. 26 is a sectional view illustrating a sealing member disposed between an edge of a driving housing and an edge of a cover according to an exemplary embodiment of the present disclosure.

Further, for pressurizing one side of the sealing member 270 that is inserted into the alignment groove 254 of the edge of the cover 250, a protrusion 246 may be formed at the edge of the driving housing 240 as shown in FIG. 25. The protrusion 246 may apply a pressure to one side of the sealing member 270 as shown in FIG. 26 when the driving housing 240 and the cover 250 are coupled to each other. Due to the protrusion 246, the sealing member 270 may be pressed between the driving housing 240 and the cover 250, and particles such as external water or dust may be prevented from entering the folding unit 200.

In addition, when the folding unit 200 and the support frame 300 are rotated for folding or unfolding of the camera mirror housing 3 by the aforementioned folding unit 200, a position of at least one of the folding unit 200 or the support frame 300 may be sensed to determine whether the folding or unfolding of the camera mirror housing 3 is completed. The position of at least one of the folding unit 200 or the support frame 300 may be sensed from the intensity of an electric current applied to the folding unit 200 or by using a position sensor. The sensed position of at least one of the folding unit 200 or the support frame 300 may be transferred to an ECU of a vehicle and be used to control displaying an image acquired by the camera 2 on the display device provided in the vehicle.

For example, the ECU of the vehicle may turn off the display device so as not to display the image acquired by the camera 2 before unfolding of the camera mirror housing 3 is completed, and may turn on the display device to display the image acquired by the camera 2 when unfolding of the camera mirror housing 3 is completed. As a result, the driver may be prevented from driving the vehicle before unfolding of the camera mirror housing 3 is completed, thereby reducing a risk of accident.

Similarly, when the ECU of the vehicle begins folding the camera mirror housing 3 in a state in which the camera mirror housing 3 is unfolded, the ECU may turn off the display device so as not to display the image acquired by the camera 2 on the display device, thereby preventing the driver from moving the vehicle in a state in which the camera mirror housing 3 is not unfolded.

The aforementioned camera mirror assembly 1 for a vehicle of the present disclosure may be preferably formed slim to minimize air resistance (e.g. an aerodynamic drag). To this end, in the embodiment of the present disclosure, a wire that enables transfer of a control signal for operation control of the camera 2 or the folding unit 200 may be disposed along a side of the support frame 300, to form the camera mirror assembly 1 slim.

Figure 27:
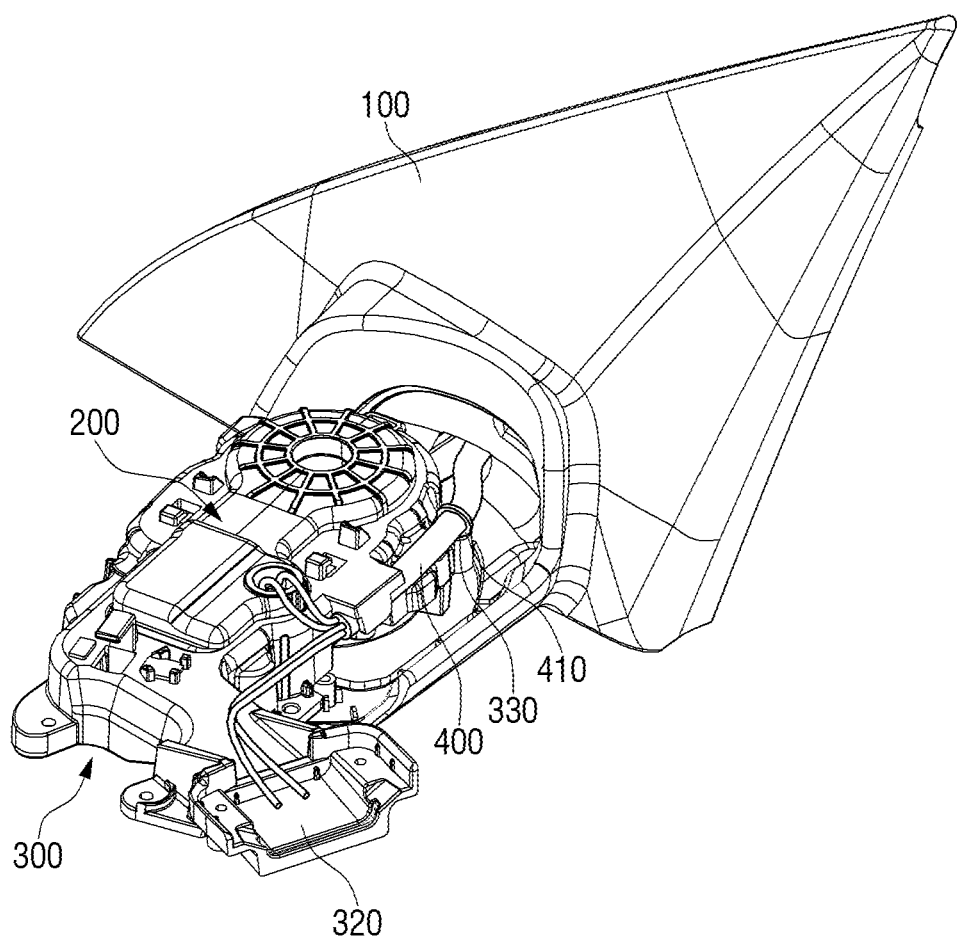
FIG. 27 is a perspective view illustrating a position of a wire according to an exemplary embodiment of the present disclosure.

In the embodiment of the present disclosure, as shown in FIG. 27, a wire fixing portion 410 for fixing a wire 400 may be coupled to the side of the support frame 300 such that the wire 400 that is extended through an opening hole 120 formed in the base 100 may be disposed at the side of the support frame 300. Further, an insertion groove 330 into which one side of the wire fixing portion 410 is inserted may be formed at the side of the support frame 300.

In the embodiment of the present disclosure, the wire fixing portion 410 may be coupled to the support frame 300 via screw coupling. However, the present disclosure is not limited thereto, and the wire fixing portion 410 may be coupled to the support frame 300 by various methods, such as hook coupling and forcible fitting, as well as screw coupling.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A camera mirror assembly for a vehicle, comprising:
   a folding unit configured to be rotated with respect to a fixed shaft formed in a base provided in the vehicle; and
   a support frame in which the folding unit and a camera are respectively mounted at both ends thereof, wherein the support frame is configured to be folded or unfolded to change a position of the camera as the folding unit rotates,
   wherein the folding unit includes:
      a driving housing;
      a driving portion being seated on the driving housing and including a driving motor and a driving gear disposed on a rotational shaft of the driving motor;
      a driven gear portion affixed to the fixed shaft;
      a driving force transfer portion for transferring a driving force transferred through the driving gear to the driven gear portion; and
      a vibration attenuator configured to attenuate vibration generated by the driving portion,
   wherein the vibration attenuator includes an elastic member mounted in a cover coupled to the driving housing and disposed to contact an end portion of the rotational shaft when the cover is coupled to the driving housing, and
   wherein the elastic member includes a guide portion formed at a distal end thereof, which is extended toward the driving housing from a proximal end mounted in the cover and curved away from the end portion of the rotational shaft.

2. The camera mirror assembly for a vehicle of claim 1, wherein the elastic member includes:
   a mounting portion mounted in the cover;
   a first extension portion extended from the mounting portion in a direction from the driving housing toward the cover; and
   a second extension portion extended from an end portion of the first extension portion in a direction from the cover toward the driving housing,
   wherein the guide portion is formed at an end portion of the second extension portion to be curved away from the end portion of the rotational shaft.

3. The camera mirror assembly for a vehicle of claim 2, wherein, when the cover is coupled to the driving housing, the end portion of the rotational shaft moves along the guide portion to contact the second extension portion, and the elastic member is elastically deformed by the end portion of the rotational shaft to allow the elastic member to apply a restoring force to the end portion of the rotational shaft.

4. The camera mirror assembly for a vehicle of claim 1, wherein the elastic member is configured to attenuate vibration generated along a direction of a rotational axis of the rotational shaft.

5. The camera mirror assembly for a vehicle of claim 1, further comprising:
   a wire that enables transfer of a control signal for operation control of the folding unit and the camera,
   wherein the wire is disposed along a side of the support frame.

6. The camera mirror assembly for a vehicle of claim 5, wherein the support frame further includes a wire fixing portion inserted into an insertion groove formed at the side thereof to fix the wire.

7. The camera mirror assembly for a vehicle of claim 1, wherein the driving force transfer portion includes at least one gear portion including an input gear to which the driving force is input and an output gear that outputs the driving force, and
   wherein the input gear is engaged with the driving gear, and the output gear is engaged with the driven gear portion.

8. The camera mirror assembly for a vehicle of claim 1, wherein the support frame is determined to be completely unfolded when the support frame is rotated to a position configured for acquiring an image of a predesignated side-rear region of a vehicle.

9. A camera mirror assembly for a vehicle, comprising:
   a folding unit configured to be rotated with respect to a fixed shaft formed in a base provided in the vehicle; and
   a support frame in which the folding unit and a camera are respectively mounted at both ends thereof, wherein the support frame is configured to be folded or unfolded to change a position of the camera as the folding unit rotates,
   wherein the folding unit includes:
      a driving housing;
      a driving portion being seated on the driving housing and including a driving motor and a driving gear disposed on a rotational shaft of the driving motor;
      a driven gear portion affixed to the fixed shaft;
      a first gear portion including a first shaft configured to be rotated about a first axis, a first input gear configured to be rotated with the first shaft and engaged with the driving gear, and a first output gear configured to be rotated with the first shaft and to output a driving force that is input to the first input gear; and
      a second gear portion including a second shaft configured to be rotated about a second axis, a second input gear configured to be rotated with the second shaft and engaged with the first output gear, and a second output gear configured to be rotated with the second shaft and to output a driving force that is input to the second input gear to the driven gear portion, and
   wherein a reinforcing plate is disposed between end portions of the first shaft and the second shaft and an inner surface of the driving housing, and
   wherein the driving housing and a cover coupled to the driving housing respectively include a first partition and a second partition configured to divide a space in which the first gear portion and the second gear portion are accommodated and a space in which the driving portion is accommodated.

10. The camera mirror assembly for a vehicle of claim 9, further comprising a sealing member disposed between an edge of the driving housing and an edge of the cover.

11. The camera mirror assembly for a vehicle of claim 9, wherein a number of gear teeth of the first output gear and a number of gear teeth of the second input gear are different.

12. The camera mirror assembly for a vehicle of claim 9, wherein an end portion of at least one of the first partition or the second partition includes a step difference having a recessed shape to allow a driving force of the driving portion to be transferred to the driving force transfer portion.

13. The camera mirror assembly for a vehicle of claim 9, wherein the first output gear has more gear teeth than the second input gear.

14. The camera mirror assembly for a vehicle of claim 9, wherein tooth profiles of the first output gear are symmetrical at both sides of the first input gear, and tooth profiles of the second input gear are symmetrical at both sides of the second output gear.

15. The camera mirror assembly for a vehicle of claim 9, wherein the first output gear and the second input gear include hollow holes into which the end portions of the first shaft and the second shaft are inserted, and each of the hollow holes of the first output gear and the second input gear exhibits a non-circular shape.

16. The camera mirror assembly for a vehicle of claim 15, wherein the driving housing includes:
   seating grooves into which the end portions of the first shaft and the second shaft are respectively inserted; and
   a mounting groove formed to be communicated with the seating grooves, allowing the reinforcing plate to be mounted therein.

17. The camera mirror assembly for a vehicle of claim 9, further comprising:
   a retainer ring coupled to an end portion of the fixed shaft,
   wherein an elastic member is disposed between the driven gear portion and the retainer ring.

18. The camera mirror assembly for a vehicle of claim 17, wherein the fixed shaft includes at least one coupling groove formed at the end portion thereof, such that the at least one coupling groove of the fixed shaft is open toward the driven gear portion,
   wherein the retainer ring includes at least one coupling protrusion formed on an inner circumferential surface of a through hole through which the end portion of the fixed shaft passes, and
   wherein as the retainer ring is rotated while compressing the elastic member, the at least one coupling protrusion is aligned at the at least one coupling groove of the fixed shaft, and the at least one coupling protrusion is inserted into the at least one coupling groove by a restoring force of the elastic member.

19. The camera mirror assembly for a vehicle of claim 9, wherein the support frame is determined to be completely unfolded when the support frame is rotated to a position configured for acquiring an image of a predesignated side-rear region of a vehicle.

* * * * *